(12) United States Patent
Imaizumi et al.

(10) Patent No.: US 12,172,357 B2
(45) Date of Patent: Dec. 24, 2024

(54) METHOD FOR PRODUCING CURABLE SILICONE SHEET HAVING HOT MELT PROPERTIES

(71) Applicant: DOW TORAY CO., LTD., Tokyo (JP)

(72) Inventors: Toru Imaizumi, Ichihara (JP); Kouichi Ozaki, Ichihara (JP); Ryosuke Yamazaki, Ichihara (JP)

(73) Assignee: DOW TORAY CO., LTD., Tokyo (JP)

( * ) Notice: Subject to any disclaimer, the term of this patent is extended or adjusted under 35 U.S.C. 154(b) by 261 days.

(21) Appl. No.: 17/418,355

(22) PCT Filed: Dec. 27, 2019

(86) PCT No.: PCT/JP2019/051391
§ 371 (c)(1),
(2) Date: Sep. 28, 2021

(87) PCT Pub. No.: WO2020/138408
PCT Pub. Date: Jul. 2, 2020

(65) Prior Publication Data
US 2022/0048230 A1    Feb. 17, 2022

(30) Foreign Application Priority Data

Dec. 27, 2018  (JP) .................................. 2018-245658
Sep. 14, 2019  (JP) .................................. 2019-167832

(51) Int. Cl.
*B29C 48/08*     (2019.01)
*B29C 48/00*     (2019.01)
(Continued)

(52) U.S. Cl.
CPC .......... *B29C 48/08* (2019.02); *B29C 48/0018* (2019.02); *B29C 48/0021* (2019.02);
(Continued)

(58) Field of Classification Search
CPC ....... B29C 48/08; B29C 48/305; B29C 48/88; B29C 48/0018; B29C 48/0021;
(Continued)

(56) References Cited

U.S. PATENT DOCUMENTS 5,100,976 A   3/1992  Hamada et al.
5,145,886 A   9/1992  Oxman et al.
(Continued)

FOREIGN PATENT DOCUMENTS

AU        618818 B2     1/1992
CN     101151328 A     3/2008
(Continued)

OTHER PUBLICATIONS

Machine translation of JP 2007-231039A; Publication: Sep. 13, 2007.*

(Continued)

*Primary Examiner* — Vishal I Patel
(74) *Attorney, Agent, or Firm* — Warner Norcross + Judd LLP

(57) ABSTRACT

Provided herein is: a method of efficiently manufacturing a curable silicone sheet with excellent flatness and uniformity, containing a curable particulate silicone composition with excellent handling/workability and curing properties; and a method of manufacturing a laminate body containing the curable silicone sheet. A method of manufacturing a curable silicone sheet having hot melt properties, comprises the following steps: 1) a step of mixing organopolysiloxane resin fine particles, a curing agent, and a functional filler; 2) a step of kneading while heating and melting the mixture obtained in step 1); 3) a step of laminating the heated and melted mixture obtained in step 2) between films provided with at least one release surface; and 4) a step of stretching the laminate body obtained in step 3) between rollers to
(Continued)

mold a curable silicone sheet having a specific film thickness.

14 Claims, 2 Drawing Sheets

(51) Int. Cl.

| | |
|---|---|
| *B29C 48/305* | (2019.01) |
| *B29C 48/88* | (2019.01) |
| *B29C 55/18* | (2006.01) |
| *C08G 77/24* | (2006.01) |
| *C08J 5/18* | (2006.01) |
| *C08K 3/013* | (2018.01) |
| *C08K 5/14* | (2006.01) |
| *C08K 9/06* | (2006.01) |
| *C09J 7/35* | (2018.01) |
| *C09J 183/04* | (2006.01) |
| *B29K 83/00* | (2006.01) |
| *B29L 7/00* | (2006.01) |

(52) U.S. Cl.
CPC ............ *B29C 48/305* (2019.02); *B29C 48/88* (2019.02); *B29C 55/18* (2013.01); *C08G 77/24* (2013.01); *C08J 5/18* (2013.01); *C08K 3/013* (2018.01); *C08K 5/14* (2013.01); *C08K 9/06* (2013.01); *C09J 7/35* (2018.01); *C09J 183/04* (2013.01); *B29K 2083/00* (2013.01); *B29L 2007/002* (2013.01)

(58) Field of Classification Search
CPC .......... B29C 55/18; C08K 3/013; C08K 5/14; C08K 9/06; C09J 7/35; C09J 183/04; B29L 2007/002
See application file for complete search history.

(56) References Cited

U.S. PATENT DOCUMENTS

| | | | |
|---|---|---|---|
| 5,169,727 A | 12/1992 | Boardman | |
| 5,357,007 A | 10/1994 | Wengrovius et al. | |
| 5,392,592 A | 2/1995 | Bozich et al. | |
| 5,977,243 A | 11/1999 | Barthel et al. | |
| 6,177,506 B1 | 1/2001 | Takahashi et al. | |
| 6,376,569 B1 | 4/2002 | Oxman et al. | |
| 6,379,792 B1 | 4/2002 | Isshiki et al. | |
| 6,433,055 B1 | 8/2002 | Kleyer et al. | |
| 8,124,689 B2 | 2/2012 | Loubert et al. | |
| 2002/0132891 A1 | 9/2002 | Azechi et al. | |
| 2004/0265599 A1 | 12/2004 | Ushio et al. | |
| 2006/0057779 A1 | 3/2006 | Sutoh et al. | |
| 2006/0094834 A1 | 5/2006 | Aoki et al. | |
| 2006/0270788 A1 | 11/2006 | Ozai et al. | |
| 2008/0319144 A1 | 12/2008 | Morita et al. | |
| 2009/0042043 A1 | 2/2009 | Joseph et al. | |
| 2009/0075009 A1 | 3/2009 | Fujisawa et al. | |
| 2009/0171013 A1 | 7/2009 | Taguchi et al. | |
| 2009/0281222 A1 | 11/2009 | Nishiumi et al. | |
| 2011/0104506 A1 | 5/2011 | Behl et al. | |
| 2011/0236666 A1 | 9/2011 | Hall et al. | |
| 2012/0139131 A1 | 6/2012 | Sugo et al. | |
| 2013/0183776 A1 | 7/2013 | Kashiwagi et al. | |
| 2013/0200554 A1 | 8/2013 | Mueller | |
| 2013/0274398 A1 | 10/2013 | Shiobara et al. | |
| 2014/0296468 A1 | 10/2014 | Kownacka et al. | |
| 2014/0377570 A1 | 12/2014 | Hirai et al. | |
| 2015/0115311 A1 | 4/2015 | Yoshida et al. | |
| 2015/0124338 A1 | 5/2015 | Mayumi et al. | |
| 2015/0183960 A1 | 7/2015 | Yamazaki et al. | |
| 2015/0315427 A1 | 11/2015 | Yoshida et al. | |
| 2015/0376482 A1 | 12/2015 | Bekemeier et al. | |
| 2016/0230005 A1 | 8/2016 | Mayumi et al. | |
| 2016/0311980 A1 | 10/2016 | Knoer | |
| 2017/0057980 A1 | 3/2017 | Boyer et al. | |
| 2017/0058103 A1 | 3/2017 | Fujisawa et al. | |
| 2017/0092822 A1 | 3/2017 | Amako et al. | |
| 2017/0166701 A1 | 6/2017 | Jo et al. | |
| 2017/0283613 A1 | 10/2017 | Mochizuki | |
| 2017/0355804 A1 | 12/2017 | Fujisawa et al. | |
| 2018/0105692 A1 | 4/2018 | Imaizumi et al. | |
| 2018/0208816 A1 | 7/2018 | Yamazaki et al. | |
| 2018/0305547 A1* | 10/2018 | Dogen | B29C 43/305 |
| 2019/0169398 A1 | 6/2019 | Yamazaki | |
| 2019/0169435 A1 | 6/2019 | Yamazaki | |
| 2019/0177488 A1* | 6/2019 | Yamazaki | C08K 3/36 |
| 2019/0276684 A1 | 9/2019 | Yamazaki et al. | |
| 2019/0367744 A1 | 12/2019 | Chevalier et al. | |
| 2020/0216671 A1 | 7/2020 | Matsuzaki et al. | |
| 2020/0224069 A1 | 7/2020 | Itoh et al. | |
| 2020/0354615 A1 | 11/2020 | Itoh et al. | |
| 2020/0392335 A1 | 12/2020 | Yamazaki | |
| 2021/0162704 A1 | 6/2021 | Sreeram et al. | |
| 2021/0179783 A1 | 6/2021 | Yoshitake | |
| 2021/0179849 A1 | 6/2021 | Yoshitake | |
| 2021/0189129 A1 | 6/2021 | Yamazaki et al. | |
| 2021/0198489 A1 | 7/2021 | Yoshitake | |
| 2021/0269691 A1 | 9/2021 | Itoh et al. | |
| 2021/0284888 A1 | 9/2021 | Itoh et al. | |
| 2021/0292607 A1 | 9/2021 | Itoh et al. | |
| 2022/0002493 A1 | 1/2022 | Sugie et al. | |
| 2022/0048230 A1 | 2/2022 | Imaizumi et al. | |
| 2022/0064447 A1 | 3/2022 | Yamazaki | |
| 2022/0064491 A1 | 3/2022 | Yamazaki | |
| 2022/0089872 A1 | 3/2022 | Fukui et al. | |
| 2022/0169894 A1 | 6/2022 | Yamazaki et al. | |
| 2022/0186099 A1 | 6/2022 | Yamazaki et al. | |
| 2022/0195269 A1 | 6/2022 | Yamazaki | |
| 2022/0340756 A1 | 10/2022 | Nishijima et al. | |
| 2022/0403114 A1 | 12/2022 | Sugie et al. | |
| 2023/0044439 A1 | 2/2023 | Yamamoto et al. | |
| 2023/0137947 A1 | 5/2023 | Yamazaki et al. | |
| 2023/0151215 A1 | 5/2023 | Yamazaki et al. | |
| 2024/0002605 A1 | 1/2024 | Tanaka et al. | |
| 2024/0052106 A1 | 2/2024 | Yamazaki et al. | |
| 2024/0052220 A1 | 2/2024 | Yamamoto et al. | |

FOREIGN PATENT DOCUMENTS

| | | |
|---|---|---|
| CN | 103849149 A | 6/2014 |
| CN | 104870585 A | 8/2015 |
| CN | 106459419 A | 2/2017 |
| CN | 106715593 A | 5/2017 |
| CN | 107429062 A | 12/2017 |
| CN | 108026373 A | 5/2018 |
| CN | 109844029 A | 6/2019 |
| EP | 1002834 A1 | 5/2000 |
| EP | 3954739 A1 | 2/2022 |
| EP | 4083140 A1 | 11/2022 |
| EP | 4130157 A1 | 2/2023 |
| EP | 4269503 A1 | 11/2023 |
| JP | H0275681 A | 3/1990 |
| JP | H0625602 A | 2/1994 |
| JP | H11158379 A | 6/1999 |
| JP | H11279182 A | 10/1999 |
| JP | H11335572 A | 12/1999 |
| JP | 2000063681 A | 2/2000 |
| JP | 2000198929 A | 7/2000 |
| JP | 2001019933 A | 1/2001 |
| JP | 2002155261 A | 5/2002 |
| JP | 2003176462 A | 6/2003 |
| JP | 2003226812 A | 8/2003 |
| JP | 2004043814 A | 2/2004 |
| JP | 2004307691 A | 11/2004 |
| JP | 2004315571 A | 11/2004 |
| JP | 2005007331 A | 1/2005 |
| JP | 2006188593 A | 7/2006 |
| JP | 2006274007 A | 10/2006 |
| JP | 2007119768 A | 5/2007 |
| JP | 2007231039 A | 9/2007 |
| JP | 2009503133 A | 1/2009 |
| JP | 2009132797 A | 6/2009 |
| JP | 2009155415 A | 7/2009 |

(56) References Cited

FOREIGN PATENT DOCUMENTS

| | | |
|---|---|---|
| JP | 2010047646 A | 3/2010 |
| JP | 2010047676 A | 3/2010 |
| JP | 2010509088 A | 3/2010 |
| JP | 2011525444 A | 9/2011 |
| JP | 2012017427 A | 1/2012 |
| JP | 2013076050 A | 4/2013 |
| JP | 2013523482 A | 6/2013 |
| JP | 2013147546 A | 8/2013 |
| JP | 2013221075 A | 10/2013 |
| JP | 2013221082 A | 10/2013 |
| JP | 2013222761 A | 10/2013 |
| JP | 2013232580 A | 11/2013 |
| JP | 5385247 B2 | 1/2014 |
| JP | 2014009322 A | 1/2014 |
| JP | 2015010132 A | 1/2015 |
| JP | 2015110752 A | 6/2015 |
| JP | 2015214637 A | 12/2015 |
| JP | 2016124967 A | 7/2016 |
| JP | 2017512224 A | 5/2017 |
| JP | 2017101137 A | 6/2017 |
| JP | 2017520918 A | 7/2017 |
| JP | 2017226724 A | 12/2017 |
| JP | 2018519369 A | 7/2018 |
| JP | 2018177993 A | 11/2018 |
| JP | 2019167832 A | 10/2019 |
| JP | 2019167833 A | 10/2019 |
| JP | 2021107149 A | 7/2021 |
| JP | 2021108319 A | 7/2021 |
| TW | 201439219 A | 10/2014 |
| WO | 2006104236 A1 | 10/2006 |
| WO | 2008056810 A1 | 5/2008 |
| WO | 2013051600 A1 | 4/2013 |
| WO | 2014002918 A1 | 1/2014 |
| WO | 2014136805 A1 | 9/2014 |
| WO | 2015056483 A1 | 4/2015 |
| WO | 2015126780 A1 | 8/2015 |
| WO | 2015155949 A1 | 10/2015 |
| WO | 2016038836 A1 | 3/2016 |
| WO | 2016103654 A1 | 6/2016 |
| WO | 2016136243 A1 | 9/2016 |
| WO | 2017068762 A1 | 4/2017 |
| WO | 2018028792 A1 | 2/2018 |
| WO | 2018030286 A1 | 2/2018 |
| WO | 2018030287 A1 | 2/2018 |
| WO | 2018030288 A1 | 2/2018 |
| WO | 2018084012 A1 | 5/2018 |
| WO | 2018186161 A1 | 10/2018 |
| WO | 2018235491 A1 | 12/2018 |
| WO | 2018235492 A1 | 12/2018 |
| WO | 2019059351 A1 | 3/2019 |
| WO | 2019078140 A1 | 4/2019 |
| WO | 2019088067 A1 | 5/2019 |
| WO | 2019208756 A1 | 10/2019 |
| WO | 2020090797 A | 5/2020 |
| WO | 2020138055 A1 | 7/2020 |
| WO | 2020138409 A1 | 7/2020 |
| WO | 2020138410 A1 | 7/2020 |
| WO | 2020166692 A1 | 8/2020 |
| WO | 2020203304 A1 | 10/2020 |
| WO | 2020203307 A1 | 10/2020 |
| WO | 2021132710 A1 | 7/2021 |
| WO | 2021200643 A1 | 10/2021 |
| WO | 2022004463 A1 | 1/2022 |
| WO | 2022138336 A1 | 6/2022 |

OTHER PUBLICATIONS

International Search Report for PCT/JP2019/051391 dated Mar. 13, 2020, 3 pages.
Machine assisted English translation of WO2018235492A1 obtained from https://patents.google.com/patent on Oct. 4, 2021, 20 pages.
Machine assisted English translation of JP2016124967A obtained from https://patents.google.com/patent on Oct. 4, 2021, 18 pages.
Machine assisted English translation of WO2016038836A1 obtained from https://patents.google.com/patent on Oct. 4, 2021, 18 pages.
Machine assisted English translation of WO2013051600A1 obtained from https://patents.google.com/patent on Oct. 4, 2021, 25 pages.
Machine assisted English translation of JP2007231039A obtained from https://patents.google.com/patent on Oct. 5, 2021, 7 pages.
Machine assisted English translation of CN103849149A obtained from https://worldwide.espacenet.com/patent on Jan. 22, 2024, 11 pages.
Machine assisted English translation of JPH11158379A obtained from https://worldwide.espacenet.com/patent on Nov. 9, 2023, 11 pages.
Machine assisted English translation of CN106715593A obtained from https://patents.google.com/patent on Mar. 14, 2023, 26 pages.
Machine assisted English translation of JP2005007331A obtained from https://patents.google.com/patent on Mar. 14, 2023, 15 pages.
Machine assisted English translation of JP2004315571A obtained from https://patents.google.com/patent on Mar. 14, 2023, 15 pages.
Machine assisted English translation of JP2015010132A obtained from https://patents.google.com/patent on Mar. 14, 2023, 22 pages.
Machine assisted English translation of JP2004307691A obtained from https://patents.google.com/patent on Mar. 14, 2023, 11 pages.
Machine assisted English translation of JP2013222761A obtained from https://patents.google.com/patent on Mar. 15, 2023, 20 pages.
Machine assisted English translation of JP2018177993A obtained from https://patents.google.com/patent on Mar. 15, 2023, 36 pages.
International Search Report for PCT/JP2019/051394 dated Mar. 17, 2020, 2 pages.
International Search Report for PCT/JP2019/051393 dated Mar. 17, 2020, 3 pages.
International Search Report for PCT/JP2019/051392 dated Mar. 17, 2020, 2 pages.
International Search Report for PCT/JP2020/012028 dated Jun. 9, 2020, 3 pages.
Machine assisted English translation of JP2013221082A obtained from https://patents.google.com/patent on Oct. 27, 2021, 14 pages.
Machine assisted English translation of WO2020138410A1 obtained from https://patents.google.com/patent on Oct. 27, 2021, 19 pages.
Machine assisted English translation of JP11335572A obtained from https://patents.google.com/patent on Oct. 27, 2021, 7 pages.
Machine assisted English translation of JPH11279182A obtained from https://patents.google.com/patent on Oct. 27, 2021, 8 pages.
Machine assisted English translation of JP2003176462A obtained from https://patents.google.com/patent on Oct. 27, 2021, 11 pages.
Machine assisted English translation of JP2009132797A obtained from https://patents.google.com/patent on Oct. 27, 2021, 9 pages.
Machine assisted English translation of JP2012017427A obtained from https://patents.google.com/patent on Oct. 27, 2021, 13 pages.
Machine assisted English translation of JP2000063681A obtained from https://patents.google.com/patent on Oct. 28, 2021, 8 pages.
International Search Report for PCT/JP2020/012027 dated Jun. 9, 2020, 3 pages.
International Search Report for PCT/JP2020/012030 dated Jun. 9, 2020, 2 pages.
International Search Report for PCT/JP2020/012029 dated Jun. 9, 2020, 3 pages.
International Search Report (with English translation) for PCT/JP2020/049074 dated Mar. 23, 2021, 7 pages.
Machine assisted English translation of JPH0625602 obtained from https://patents.google.com/patent on Nov. 11, 2022, 6 pages.
Machine assisted English translation of JP2019167832 obtained from https://patents.google.com/patent on Nov. 11, 2022, 11 pages.
Machine assisted English translation of JP2019167833 obtained from https://patents.google.com/patent on Nov. 11, 2022, 9 pages.
International Search Report (with English translation) for PCT/JP2021/012840 dated Jun. 15, 2021, 6 pages.
English translation of International Search Report for PCT/JP2022/046146 dated Jan. 31, 2023, 2 pages.
Machine assisted English translation of JP2017101137A obtained from https://worldwide.espacenet.com/patent on Apr. 7, 2024, 18 pages.

(56) References Cited

OTHER PUBLICATIONS

Machine assisted English translation of JP2021108319A obtained from https://worldwide.espacenet.com/patent on Mar. 12, 2024, 73 pages.
Machine assisted English translation of WO2020138055A1 obtained from https://worldwide.espacenet.com/patent on Apr. 7, 2024, 43 pages.
English translation of International Search Report for PCT/JP2019/042320 dated Mar. 24, 2020, 2 pages.
Machine assisted English translation of JP2010047676A obtained from https://patents.google.com/patent on Aug. 19, 2024, 8 pages.
Machine assisted English translation of JP2015214637A obtained from https://patents.google.com/patent on Jul. 21, 2021, 11 pages.
Machine assisted English translation of JP2017101137A obtained from https://patents.google.com/patent on Jul. 21, 2021, 11 pages.
English translation of International Search Report for PCT/JP2021/046092 dated Feb. 8, 2022, 2 pages.
English translation of International Search Report for PCT/JP2021/046093 dated Mar. 15, 2022, 2 pages.
Dowsiltm EA-4600 Silicone Adhesive Application Guide for PCT Device Assemblies (Dow Toray Co., Ltd. publication, Form No. 1-3497-42-1120 S2D, 2020).
Machine assisted English translation of WO2019208756A1 obtained from https://worldwide.espacenet.com/patent on Dec. 21, 2023, 32 pages.
Machine assisted English translation of JP2017226724A obtained from https://patents.google.com/patent on Aug. 14, 2024, 14 pages.
Machine assisted English translation of JP2003226812A obtained from https://patents.google.com/patent on Aug. 14, 2024, 11 pages.
Machine assisted English translation of JP2010047646A obtained from https://patents.google.com/patent on Aug. 14, 2024, 9 pages.

\* cited by examiner

[FIG. 1]
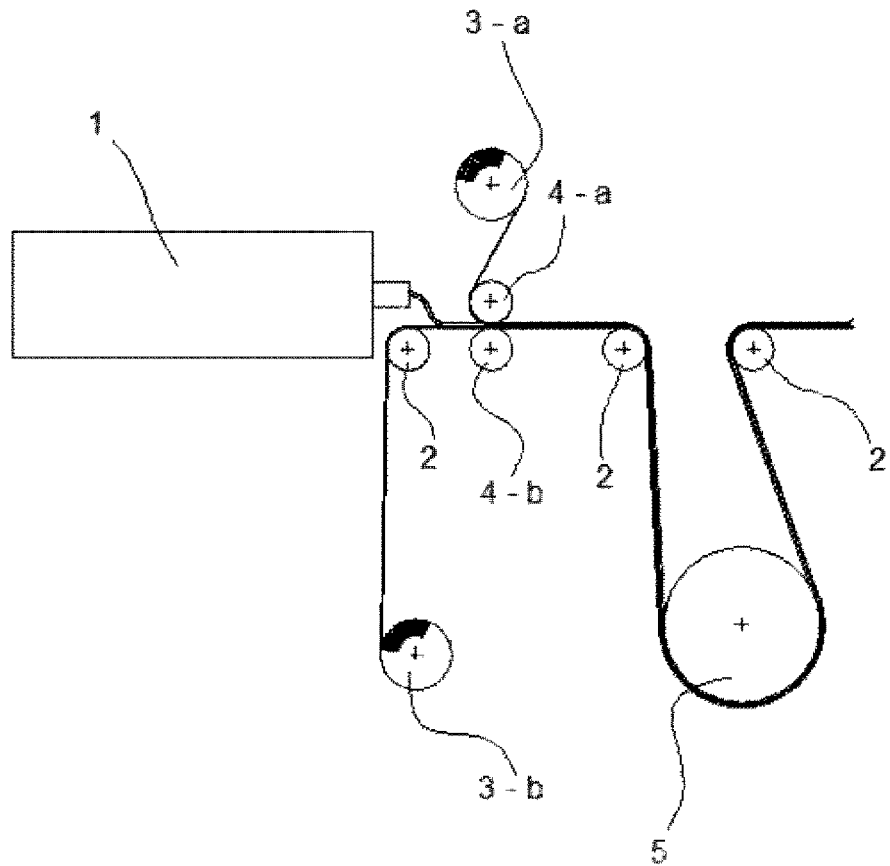
[FIG. 2]
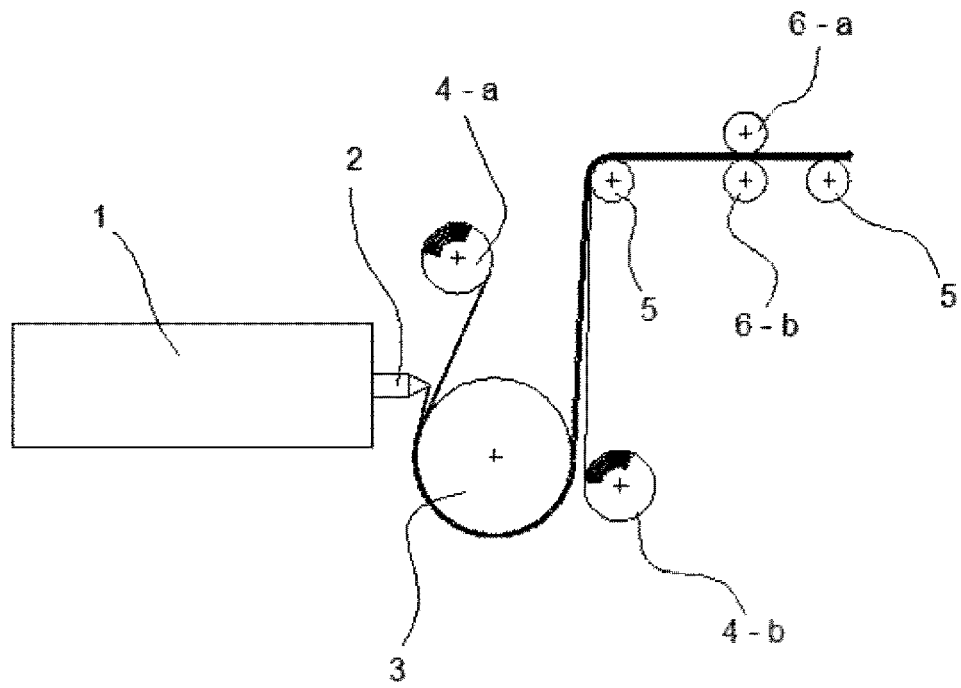

[FIG. 3]
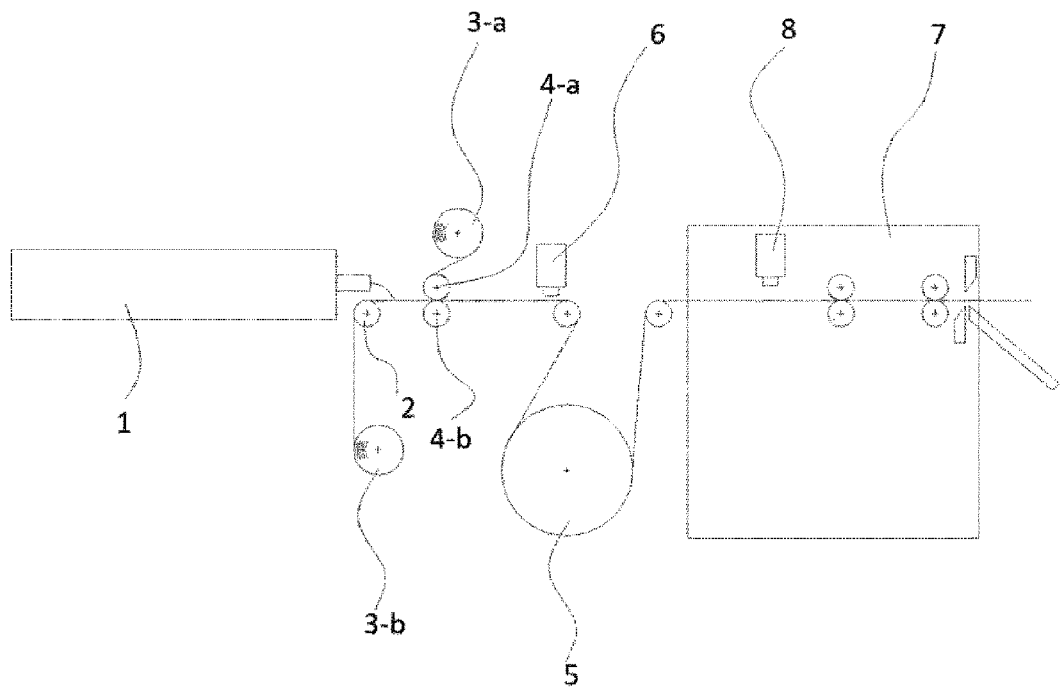

METHOD FOR PRODUCING CURABLE SILICONE SHEET HAVING HOT MELT PROPERTIES

CROSS-REFERENCE TO RELATED APPLICATIONS

This application is the National Stage of International Appl. No. PCT/JP2019/051391 filed on 27 Dec. 2019, which claims priority to and all advantages of Japanese Patent Application No. 2018-245658 filed on 27 Dec. 2018 and Japanese Patent Application No. 2019-167832 filed on 14 Sep. 2019, the contents of which are hereby incorporated by reference.

TECHNICAL FIELD

The present invention relates to: a method of manufacturing, which is simple and can obtain a curable silicone sheet having hot melt properties with excellent flatness and uniformity; and a laminate body having a curable silicone sheet having hot melt properties laminated between films having at least one release surface, which can be obtained by the manufacturing method.

BACKGROUND ART

Curable silicone compositions are utilized in a wide range of industrial fields because they are cured to form cured products having excellent heat resistance, cold resistance, electrical insulation, weather resistance, water repellency, and transparency. In general, the cured product of such a curable silicone composition is also suitable as an encapsulant for optical materials and semiconductor devices because it is not readily discolored as compared with other organic materials, and there is less deterioration of physical properties.

The present applicant has proposed, in Patent Document 1 and Patent Document 2, a so-called hot melt curable granular silicone composition and a reactive silicone composition for molding. These silicone compositions are made up of so-called phenyl silicone resins, which have the advantages of superior hot-melt properties and superior hardness and strength of the cured product when compared to methyl silicone resins.

Furthermore, in Patent Documents 3 to 5, the Applicants propose that the use of inorganic fillers that do not contain coarse particles in a curable granular silicone composition can improve the toughness and durability, especially at high temperatures, the gap-filling property during melting, and the optical reflectance.

On the other hand, as these curable particulate silicone compositions are required to be applied to various semiconductor applications including power semiconductors, these curable granular silicone compositions may be required to be used as uniform hot melt curable silicone sheets. However, when a curable granular silicone composition is molded into a sheet by a conventional method, there is a demand for means of obtaining a curable silicone sheet having hot melt properties with excellent flatness and uniformity by a simple method.

On the other hand, Patent Document 6 describes: a method of combining components including a silicone resin, an organopolysiloxane, a silane crosslinking agent, a catalyst and a solvent and then supplying the combination to an extruder to remove volatile material to obtain a curing hot melt silicone adhesive composition; and a method of molding the composition between release liners. However, there is no description in particular of a thermosetting hot melt silicone composition or a curable granular silicone composition, and when an attempt is made to mold a thermosetting silicone composition or the like into a sheet by the methods, breaking or defects in the curable silicone sheet may occur. Furthermore, when the manufacturing methods are applied at a high temperature, particularly for a thermosetting hot melt silicone composition, the curing reaction may progress, and thus it may not be possible to obtain a sheet material having hot melt properties.

RELATED ART DOCUMENTS

Patent Documents

Patent Document 1: International Publication WO 2016/136243 Pamphlet
Patent Document 2: Japanese Unexamined Patent Application No. 2014-009322
Patent Document 3: International Publication WO 2018/030286 Pamphlet
Patent Document 4: International Publication WO 2018/030287 Pamphlet
Patent Document 5: International Publication WO 2018/030288 Pamphlet
Patent Document 6: Japanese Unexamined Patent Application Publication (Translation of PCT Application) No. 2011-525444

SUMMARY OF THE INVENTION

Problem to be Solved by the Invention

An object of the present invention is to provide a method of efficiently manufacturing a curable silicone sheet with hot melt properties, excellent handling/workability and curing properties, and excellent flatness and uniformity. Furthermore, an object of the present invention is to provide a laminate body containing the curable silicone sheet and a method of manufacturing the same.

Means for Solving the Problem

As a result of extensive studies, the present inventors discovered that the aforementioned problems can be solved by a method of manufacturing a curable silicone sheet having hot melt properties, characterized by the following steps, and thus arrived at the present invention.

Step 1: A step of mixing organopolysiloxane resin fine particles, a curing agent, and a functional filler
Step 2: A step kneading the mixture obtained in step 1 while heating and melting at a temperature of 120° C. or lower
Step 3: A step of laminating the heated and melted mixture obtained in step 2 between films provided with at least one release surface
Step 4: A step of stretching the laminate body obtained in step 3 between rollers to mold a curable silicone sheet having a specific film thickness The method of manufacturing a curable silicone sheet is preferably a method of manufacturing, where
the melt viscosity of the heated and melted mixture obtained in step 2, as measured by a Koka flow tester at 150° C., is within a range of 1 to 1,000 Pas,
in step 3, a step of laminating the heated and melted mixture between the films having at least one release surface is a step of laminating the heated and melted mixture between the films having at least one release surface by discharging the heated and melted mixture while molding into a film or a string using a die and a nozzle, and as a pre-step of step 4 or in step 4, the entire laminate body obtained in step 3 further includes a step of cooling or adjusting the temperature between 80 and 120° C.

In particular, the manufacturing method is useful from the perspective that the mixture can be temporarily molded by a die when the melt viscosity of the heated and melted mixture is low.

The manufacturing method of the curable silicone sheet is preferably a method of manufacturing a curable silicone sheet, where the softening point of the entire mixture obtained in step 2 is 200° C. or less, step 2 is a step of heating the entire mixture obtained in step 1 to a temperature above the softening point of the mixture, and in step 3, a step of laminating the heated and melted mixture between the films having at least one release surface is a step of laminating the heated and melted mixture between the films having at least one release surface by discharging the heated and melted mixture in a solid form.

Note that in the case where the film thickness is adjusted in step 4 for the laminate body containing the mixture discharged in a solid state, it is preferable that the film thickness adjusting roller is further provided with a temperature controlling function, and the manufacturing method of stabilizing the film thickness of the obtained curable silicone sheet by roller stretching with the temperature controlling function is preferable. In particular, the manufacturing method is useful from the perspective that the mixture can be formed into a sheet without temporary molding when the molten viscosity of the heated and melted mixture is high.

In the aforementioned method of manufacturing a curable silicone sheet, steps 2 to 4 are successive steps, and the time from the start of step 2 to the end of step 4 may be 30 minutes or less. In particular, Step 3 and Step 4 can be continuous and integrated, for example, the heated and melted mixture obtained in Step 2 is laminated by being discharged or applied between two films having at least one release surface directly under the rollers, and at the same time, the film may be stretched and molded to a specific thickness by adjusting the gap between the rollers. Thus, a manufacturing method having a step in which Step 3 and Step 4 are substantially integrated is included within the scope of the above manufacturing method.

The aforementioned method of manufacturing the curable silicone sheet may further include a step of cutting the laminate body containing the curable silicone sheet obtained in step 4.

In step 3 in the method of manufacturing a curable silicone sheet, the step of laminating the heated and melted mixture obtained in step 2 between the films having at least one release surface may be a step of discharging the heated and melted mixture while molding into a film or string using a die selected from T dies and strand dies and a nozzle selected from single nozzles and multi nozzles, and then laminating between the films having at least one release surface.

In the method of manufacturing the curable silicone sheet, in the mixture of the organopolysiloxane resin fine particles, the curing agent, and the functional filler in step 1, the organopolysiloxane resin fine particles may be organopolysiloxane resin fine particles containing at least 20 mol % or more of a siloxane unit (R represents an aryl group) as expressed by $RSiO_{3/2}$ or $SiO_{4/2}$.

In the method of manufacturing the curable silicone sheet, the mixture of organopolysiloxane resin fine particles, curing agent, and functional filler obtained by step 2 preferably provides, by curing, a cured product where the value of the storage modulus (G') at 25° C. is 2000 MPa or less, the value of the storage modulus (G') at 150° C. is 100 MPa or less, and the peak value of the loss tangent (tan δ) as expressed by storage modulus/loss modulus (G'/G") at a frequency of 1.0 Hz is 0.40 or more.

In the method of manufacturing a curable silicone sheet, the mixture of the organopolysiloxane resin fine particles having hot melt properties, curing agent, and functional filler in step 1 preferably provides, by curing, a cured product, where the (1) maximum torque measured from a molding temperature of room temperature through 200° C. using an MDR (Moving Die Rheometer) is less than 50 dN·m and the (2) loss tangent (tan δ) as expressed by the ratio of stored torque value/lost torque value is less than 0.2.

In the method of manufacturing the curable silicone sheet, the cured silicone sheet may be a curable silicone sheet for compression molding or for press molding for vacuum lamination, and the curable silicone sheet for compression molding or for vacuum lamination is particularly preferable.

In the method of manufacturing the curable silicone sheet, the curable silicone sheet may be a hot melt film adhesive.

In the method of manufacturing a curable silicone sheet, the curable silicone sheet may be an essentially flat curable silicone sheet having a thickness of 10 to 2000 μm.

Furthermore, a problem of the present invention is also solved by a laminate body containing an essentially flat, hot melt curable silicone sheet of with a thickness of 10 to 2000 μm, which contains organopolysiloxane resin fine particles, a curing agent and a functional filler, and having a laminated structure between films with at least one release surface. Both of the films may and preferably are provided with a release surface.

The laminate body preferably has a release surface that is a release coating layer obtained by curing a curable organopolysiloxane composition containing one or more types of an organopolysiloxane having a substitution group containing fluorine bonded to a silicon atom in one molecule, and the thickness of at least one film providing the release surface that is 50 μm or more. The fluorine substitution group is preferably one or more types of substitution groups containing fluorine selected from fluoroalkyl groups and perfluoropolyether groups. The curable organopolysiloxane is preferably one or more types of organopolysiloxane that contains a substitution group containing fluorine bonded to a silicon atom and a curing-reactive functional group in one molecule.

The method of manufacturing the laminate body preferably includes the method of manufacturing the curable silicone sheet in a step thereof.

Effects of the Invention

The present invention provides a method of efficiently manufacturing a curable silicone sheet having excellent flatness and uniformity. The curable silicone sheet contains a curable particulate silicone composition, has hot melt properties, has excellent handling/workability and curing characteristics, and preferably has excellent gap filling properties when melted, and can form a flexible cured product with excellent stress relaxation. Furthermore, the curable silicone sheet of the present invention can be provided with a low linear expansion coefficient, thermal conductivity, or light reflectivity to the cured product by changing the type of the functional inorganic filler in the curable particulate silicone composition. Furthermore, the present invention can provide: a laminate body containing the curable silicone sheet, such as a releasable laminate body containing a hot melt film adhesive; and a method of manufacturing the same.

BRIEF DESCRIPTION OF THE DRAWINGS

FIG. 1 illustrates a configuration of a manufacturing device of a curable silicone sheet of Example 1.

FIG. 2 illustrates a configuration of a manufacturing device of a curable silicone sheet of Example 2.

FIG. 3 illustrates a configuration of a manufacturing device of a curable silicone sheet of Example 3.

DESCRIPTION OF THE PREFERRED EMBODIMENT

[Manufacturing Method of the Curable Silicone Sheet]

The curable silicone sheet of the present invention has hot melt properties and contains a curable particulate silicone composition containing organopolysiloxane resin fine particulates, a curing agent, and a functional filler, and may contain straight chain organopolysiloxane if necessary. The manufacturing method of the present invention includes the following steps 1 to 4:

Step 1: A step of mixing organopolysiloxane resin fine particles, a curing agent, and a functional filler Step 2: A step kneading the mixture obtained in step 1 while heating and melting at a temperature of 120° C. or lower Step 3: A step of laminating the heated and melted mixture obtained in step 2 between films provided with at least one release surface Step 4: A step of stretching the laminate body obtained in step 3 between rollers to mold a curable silicone sheet having a specific film thickness Herein, "having hot melt properties" means having a softening point within a range of 50° C. to 200° C. and having properties where softening or flowing occurs when heated. Furthermore, the curable silicone sheet should have hot melt properties as a mixture, regardless of the hot melt properties of the organopolysiloxane resin fine particles, which are a component thereof.

[Step 1]

Step 1 described above is a mixing step for a curable particulate silicone composition containing organopolysiloxane resin fine particles, a curing agent, and a functional filler. Each of these components will be described below. Furthermore, in this present step 1, optional components other than the aforementioned components (for example, straight chain organopolysiloxane, curing retardants, other additives, and the like) may be mixed without particular limitation, and the curable particulate silicone composition may be obtained by the mixing.

The mixture obtained by step 1 is a curable particulate silicone composition, and the mixture as a whole has hot melt properties. On the other hand, the mixture is non-fluid at 25° C. Here, the term "non-fluid" means that it is not deformed or flowed in a no-load condition, and it is preferable that it is not deformed or flowed in a no-load condition at 25° C. when it is molded into a pellet, a tablet, or the like. Such non-fluid can be evaluated, for example, by placing a molded product of the composition on a hot plate at 25° C. and substantially not deforming or flowing under no load or constant weight. This is because when non-fluid at 25° C., shape retention at this temperature is good and the surface tackiness is low.

The softening point of the mixture obtained by step 1 is 200° C. or lower, and preferably 150° C. or lower. Such a softening point means a temperature at which the deformation amount in the height direction is 1 mm or more when the deformation amount of the composition is measured after the load is removed by continuing to press the hot plate with a load of 100 grams for 10 seconds from above.

The softening point of the mixture obtained by step 1 is 200° C. or less. By heating the entire mixture to a temperature higher than the softening point of the mixture in step 2 described later, the mixture can be heated and melted to provide a certain fluidity. The softened or melted material can be molded to obtain a curable silicone sheet containing a curable particulate silicone composition and having hot melt properties.

The step of mixing the organopolysiloxane resin fine particles, the curing agent and the functional filler, as well as other arbitrary components (for example, a straight chain organopolysiloxane may be used), is not particularly limited, but the entire mixture can be preferably manufactured by mixing powder at a temperature less than the softening point of the organopolysiloxane resin fine particles. The powder mixer used in the present manufacturing method is not limited, and examples include a uniaxial or biaxial continuous mixer, a two-roller mixer, a ROSS mixer, a Hobart mixer, a dental mixer, a planetary mixer, a kneader mixer, a laboratory mill, a small-sized mill, and a Henschel mixer, and preferably, a laboratory mill, a small grinder, or a Henschel mixer.

[Step of Removing Low Molecular Weight Component from Organopolysiloxane Resin Component]

Note that from the perspective of improving the strength and physical properties of a cured product of the curable silicone sheet obtained in the present manufacturing method, a low molecular weight component is preferably removed as much as possible from the organopolysiloxane resin component, such as organopolysiloxane resin fine particles and the like, at a stage before entering step 2, which is described next. Details thereof will be described in detail in a section of a description related to the organopolysiloxane resin fine particles of the present invention.

[Step 2]

Step 2 is a step in which the mixture obtained in step 1 is kneaded while being heated and melted at a temperature of 120° C. or lower. By heating and kneading the mixture having heat melting properties at a temperature above the softening point, preferably within a temperature range of 80° C. to 120° C., the entire composition is melted or softened, and the organopolysiloxane resin fine particles, curing agent, and functional filler can be uniformly and entirely dispersed. When the mixture is pressurized and molded into a sheet in step 4 after passing through step 3, a uniform thin layered molded sheet can be formed by a single pressurization. Moreover, there is a practical benefit in avoiding molding defects and cracks in the sheet itself. On the other hand, if the temperature is less than the lower limit, softening may be insufficient and a molten or softened mixture in which each component is uniformly and entirely dispersed may be difficult to obtain, even by using mechanical force. Even if the mixture is pressure-molded into a sheet in step 4 after passing through step 3, a uniform thin layered molded sheet may not be formed, which may cause breaking or cracking of the sheet. Conversely, if the temperature exceeds the upper limit, the curing agent may react during mixing, causing the entire product to significantly thicken or cure and lose hot melting properties, and thereby forming a cured product that does not achieve the object of the present invention. In other words, controlling the temperature to the aforementioned range in step 2 is an essential component of the present invention.

Furthermore, the powdery mixture is mixed while being heated and melted in this process, and therefore, air is entrained during mixing, which is very likely to appear as bubbles in the sheets produced in step 3 and adversely affect the quality and heat melting properties of the curable silicone sheets having hot melt properties. Therefore, mixing while degassing is preferable. The degree of degassing can be adjusted as appropriate depending on the entrainment of air during mixing (in other words, the amount of air bubbles), but depressurization degassing is preferably less than 1 atm.

If the heat melt viscosity of the mixture obtained in step 1 is low and the mixture has favorable fluidity, lamination is possible on the release film after temporary molding in advance in step 3 described later, which is preferable. Specifically, so long as the melt viscosity of the heated and melted mixture obtained in step 2-A is within a range of 1 to 1,000 Pas as measured by a Koka flow tester at 150° C., temporary molding can be performed in step 3.

On the other hand, if the mixture obtained in step 1 has a high heat melt viscosity and inferior fluidity, the mixture obtained in step 1 may be melt-kneaded at a temperature above the softening point thereof in step 2 to obtain a uniform compositional form and then laminated onto the release film in step 3 without temporary molding.

The mixing device in step 2 is not limited, and can be: a kneader, a Banbury mixer, a Henschel mixer, a planetary mixer, a two-roller mill, a three-roller mill, a Ross mixer, a Labo Plastomill, or the like, or other batch type mixer, provided with heating and cooling functions; and a single-screw extruder, a twin-screw extruder, continuous kneader, or other continuous type heating and kneading equipment provided with heating and cooling functions. The mixer is not particularly limited, but is selected in accordance with the efficiency of the processing time and the ability to control the shear heat generation. In view of processing time, the mixer may be a continuous heating and kneading device, such as a single screw extruder, a twin screw extruder, or the like, or a batch type mixer such as a Labo Plastomill or the like. However, from the perspective of production efficiency of the curable silicone sheet, a continuous heating and kneading device such as a single-screw extruder, a twin-screw extruder, and the like is preferably used.

[Step 3]

Step 3 is a step of laminating the heated and melted mixture obtained in step 2 between films provided with at least one release surface, and is a preliminary step for pressure molding in step 4. For this reason, step 3 and step 4, which is a subsequent step, can be integrated, and if necessary, step 3 and step 4 can be performed essentially simultaneously. By forming a laminate body in which the mixture obtained in step 2 is sandwiched between the films, a sheet-like molded product can be obtained by pressure molding by roller stretching from the film, and after molding, only the film can be removed from the sheet-like molded product using the release surface.

The heated and melted mixture obtained in step 2 is laminated between two films. Depending on the form of use of the obtained curable silicone sheet, the two films preferably both have a release surface, and in step 3, the mixture obtained in step 2 is particularly preferably laminated between the release surfaces of the films. By adopting such laminated form, a laminate sheet where the thin layer curable silicone sheet is interposed between releasable films and which can be released from both sides can be obtained through the pressure molding in step 4 and then optional cutting. At the time of use, only the curable silicone sheet can be exposed by peeling off the film on both surfaces without concern for damaging the formed curable silicone sheet.

The substrate of the film used in step 3 is not particularly limited, and examples include paperboard, cardboard paper, clay-coated papers, polyolefin laminate papers, particularly polyethylene laminate papers, synthetic resin films and sheets, natural fiber woven materials, synthetic fiber woven materials, artificial leather woven materials, and metal foils. Synthetic resin films and sheets are particularly preferable, and examples of synthetic resins include polyimide, polyethylene, polypropylene, polystyrene, polyvinyl chloride, polyvinylidene chloride, polycarbonate, polyethylene terephthalate, and nylon. When heat resistance is required, a heat-resistant synthetic resin film such as a polyimide, polyetheretherketone, polyethylene naphthalate (PEN), liquid crystal polyacrylate, polyamide-imide, polyether sulfone, and the like is particularly preferable. Meanwhile, for applications such as a display device in which visibility is required, a transparent substrate and specifically a transparent material such as a polypropylene, polystyrene, polyvinylidene chloride, polycarbonate, polyethylene terephthalate, PEN, and the like is preferable.

Although the thickness of the film is not particularly limited, when the melt viscosity of the obtained melted mixture is high, the film is exposed to considerable pressure in a high temperature state in the stretching step by rollers in step 4, and if a film having high heat resistance is not used, wrinkles or the like may occur during stretching if the film is too thin. Therefore, the film thickness is preferably 50 μm or more, more preferably 75 μm or more, even more preferably 75 to 300 μm, and particularly preferably 75 to 200 μm.

The film is preferably provided with at least one release layer, and the release layer is preferably in contact with the mixture obtained in step 2. This allows the pressure-molded hot melt curable silicone sheet to be easily released from the film through step 3 and step 4. The release layer may also be referred to as a release liner, a separator, a release layer, or a release coating layer, and may preferably be a release layer having a release coating ability such as a silicone-based release agent, a fluorine-based release agent, an alkyd-based release agent, a fluorosilicone-based release agent, or the like, or it may be formed as a substrate itself which is not prone to adhering to the hot melt curable silicone sheet according to the present invention by forming physically fine irregularities in the surface of the substrate.

As described later, the curable silicone sheet having hot melt properties is laminated between two films. When using a silicone sheet, both of the two films are usually released, but only one film may be released and the silicone sheet may be cured with one side of the film remaining. In this case, the film that can be easily released even after the silicone sheet is cured is preferably selected.

The release surface on the film is preferably a release coating layer obtained by a fluorosilicone release agent from the perspective of the releasability with regard to the curable silicone sheet. Herein, the fluorosilicone based release agent is a curable organopolysiloxane composition containing one or more types of an organopolysiloxane having a substitution group containing fluorine bonded to a silicon atom in one molecule, and a curable organopolysiloxane composition is particularly preferably used, which contains one or more types of an organopolysiloxane containing a substitution group containing a fluorine group selected from fluoroalkyl groups and perfluoropolyether groups in one molecule.

Note that the organopolysiloxane containing a substitution group containing a fluorine group may further have a curing reactive group such as an alkenyl group or the like within the same molecule, and two or more types of organopolysiloxanes containing different substitution groups containing a fluorine group may be combined and used at a specific mixing ratio.

For example, the release coating layer obtained by the fluorosilicone release agent that can be used in the present invention may be a release coating layer obtained by curing the following compositions (i) to (iv).

(i) A curable organopolysiloxane composition containing two or more types of organopolysiloxane having mutually different fluoroalkyl groups and having a curing reactive group in a molecule (ii) A curable organopolysiloxane composition containing two or more types of organopolysiloxane having mutually different perfluoropolyether groups and having a curing reactive group in a molecule (iii) A curable organopolysiloxane composition containing an organopolysiloxane having a fluoroalkyl group and curing reactive group in a molecule, and an organopolysiloxane having a perfluoropolyether group and curing reactive group in a molecule (iv) A curing organopolysiloxane composition containing one or more substitution groups containing fluorine selected from fluoroalkyl groups and perfluoropolyether groups in a molecule, having no curing reactive groups, and having a property of mixing with another curing reactive component In the present invention, for practical purposes, the release surface on the film is a release coating layer obtained by a fluorosilicone release agent, and specifically, a fluorosilicone coating containing a perfluorobutylethyl group is preferable. Examples of film products subjected to such a release coating treatment include FL1-01, FL1-02, FL1-03, and FL2-01 of TAKARA INC. CO. Ltd., FSA6, FSB6, and FSC6 of Nippa Co., Ltd., and FB and FE of I'm Corporation and the like. Note that for the fluorosilicone coating using a curable organopolysiloxane composition containing an organopolysiloxane having a substitution group containing fluorine such as a perfluorobutylethyl group or the like on a side chain or at an end, desired release characteristics can be designed by selecting a crosslinking structure and crosslinking density and the thickness of the release layer. In implementing the present invention, a release coating film having an appropriate release force may be selected from the commercial products described above, and a film that provides the desired release characteristics may be designed and used as appropriate.

In step 3, the mixture obtained in step 2 is laminated between two films. The step is not particularly limited, but may be (i) a step of laminating the heated and melted mixture between a first film and a second film by discharging or applying the heated and melted mixture onto the first film having a release surface and then bringing the second film into contact with the mixture, or (ii) a step of laminating the heated and melted mixture between a first film and a second film having a release surface by discharging or applying the heated and melted mixture between the two films. The steps are particularly preferably continuous steps.

The mixture obtained in step 2 may be supplied by being discharged or applied onto the release layer of one film. A laminate body may be formed by attaching the release layer of the other film from the mixture, or the laminate body may be formed by supplying the mixture by being continuously discharged or applied between the two films. At this time, in the step of manufacturing a curable silicone sheet, each film is transported via a rotating roller to a supply position of the mixture in step 2, and a lamination operation between films is performed. The diameter and width of the rotating roller are not particularly limited, but the structure is preferably capable of uniform pressure in a width direction. The pressurizing method is not particularly limited, but an air cylinder or hydraulic system is preferred.

The supply rate of the mixture obtained in step 2 between the films in step 3 can be designed based on the manufacturing speed and scale thereof. As an example, the mixture obtained in step 2 can be supplied between the films at a supply rate of 1 to 10 kg/hour, but needless to say, is not limited thereto. However, in step 3, the amount of the mixture obtained in step 2 that is laminated between the films must be determined based on the average thickness of the curable silicone sheet designed in step 4, and must be a thickness that allows rolling processing in step 4.

If the mixture obtained in step 1 has a low heat melt viscosity and is highly fluid, in step 3, the heated and melted mixture obtained in step 2 is preferably discharged while being molded into a film or string shape (including a rod-shaped molded product discharged from a narrow diameter hole portion) using a die and a nozzle, and then laminated between films. Herein, the die is used to temporarily mold the mixture, and although the type of the die and the thickness at the time of the temporary molding are not particularly limited, the mixture can be and is preferably temporarily molded into an essentially sheet shape having a thickness within a range of 100 to 2000 µm (=2 mm) using a T-die or a strand die equipped with a structure capable of heating. Furthermore, if necessary, a die may be used, in which the discharge port of these T-dies or strand dies is deformed into a flattened shape with respect to a discharge surface (horizontal direction).

If the mixture obtained in step 2 has a low heat melt viscosity and is highly fluid, a step of cooling or adjusting the temperature of the entire laminate body obtained in step 3 is preferably included as a step prior to step 4 or in step 4, after the temporary molding described above. This is because the heated molten product is cooled to a solid state to effectively perform pressure molding in step 4. The cooling step is not particularly limited, but can be performed by cooling the mixture supplied or laminated on the film by a cooling roller, cold air, or the like within a range of $-50°$ C. to room temperature using cooling means such as air cooling, a cooling solvent, or the like.

On the other hand, if the mixture obtained in step 2 has a high heat melt viscosity and low fluidity, and if the entire laminate body is cooled in step 3, the viscosity of the mixture becomes too high, and thus the film thickness is difficult to control. Therefore, a step of adjusting the temperature of the entire laminate body between 80 and 120° C. is preferably included as a step prior to step 4 or as step 4. Note that details of temperature control will be described in step 4. On the other hand, if the mixture obtained in step 1 has a high heat melt viscosity and inferior fluidity, a semi-solid mixture may be supplied and laminated on the film in step 3 without performing temporary molding.

[Step 4]

Step 4 is a step in which the laminate body obtained in step 3 described above is stretched between rollers to form a curable silicone sheet having a specific film thickness, and in which the mixture obtained in step 2 is applied and stretched on from the film to mold a uniform curable silicone sheet. The number of pairs of rolling rollers may be single or a plurality.

The rolling step in step 4 can be performed on the laminate body obtained in step 3 using a known rolling method such as roller rolling or the like. In particular, roller rolling has an advantage where the curable silicone sheet with a desired thickness can be designed by adjusting a gap between rollers. For example, a curable silicone sheet having excellent flatness and very few defects on the sheet surface and inside the sheet can be obtained by adjusting the gap between the rollers to a constant level where the average thickness is within a range of 10 to 2000 μm and then rolling. More specifically, for roller rolling, the gap between the rollers is particularly preferably adjusted to be within a range of 1.5 to 4.0 times the average thickness of the target organopolysiloxane cured film.

By stretching in accordance with step 4, an essentially flat, 10 to 2000 μm thick curable silicone sheet can be obtained. By roller stretching the heated and melted mixture in step 2 in the form of a laminate body between the release films in accordance with step 3, a releasable laminate body containing a curable silicone sheet having hot melt properties, which has low defects and excellent handling workability by releasing, can be obtained. Furthermore, by attaching a film thickness meter, the film thickness can be measured with regard to the laminate body obtained in step 3. Thus, adjustment of the film thickness is easy and the film thickness can be managed.

[Temperature Adjustment in Step 4]

In step 4, when the laminate body obtained in step 3 is stretched between rollers, the rollers are preferably further provided with a temperature controlling function to control the temperature of the entire laminate body during roller rolling and to perform heating or cooling as necessary. Adjusting the temperature has benefits where a gap between the rollers can be stably maintained, and the flatness and uniformity (uniformity of film thickness) of the obtained curable silicone sheet having hot melt properties can be improved. A specific range of temperature adjustment can be designed as appropriate based on the heat resistance of the film, the thickness of the curable silicone sheet (design thickness), reactivity thereof, and the like, but is generally within a range of 5 to 120° C.

If the melt viscosity of the heated and melted mixture obtained in step 2 is high, the viscosity of the mixture may become too high if the temperature of the mixture has significantly dropped at the time of lamination by rollers, and thus the film thickness is difficult to control. In order to avoid this, if the mixture has a high heat melt viscosity, supplying to the rotating rollers is required without reducing the temperature of the mixture. The mixture can be supplied to the rotating rollers at essentially the same temperature as an outlet port temperature of the heating and kneading device, and the viscosity can be prevented from increasing by heating the rollers themselves to a temperature range of 80 to 120° C., by narrowing the distance between the rollers and a die, which is an outlet port of a continuous heating and kneading device such as a twin-screw extruder or the like, as much as possible, or by performing another treatment.

On the other hand, if the temperature of the mixture or the roller itself is significantly higher than 120° C., there is a concern that the reaction of the heat curable mixture may advance or, if the heat resistance of the film used is low, the film may wrinkle during stretching, and therefore, precise temperature control is required in this step.

[Control of Time from Start of Step 2 to End of Step 4]

Although the aforementioned steps 2 to 4 are preferably continuous steps from the perspective of industrial mass production, when a thermosetting composition is treated as a hot melt composition, the curable silicone composition is mixed in step 1. Therefore, if the composition is exposed to a high temperature for a long period of time from the start of step 2, a curing reaction of the composition may advance, and the curability of the ultimately obtained hot melt curable silicone sheet may be adversely affected. In order to prevent this, temperature control during the aforementioned mixing is important. Furthermore, the time from the end of step 2 to the start of cooling of the obtained silicone sheet after the end of step 4 is a short time, specifically, preferably within 30 minutes, more preferably within 15 minutes, and even more preferably within 5 minutes. When the time of exposure to a high temperature in the manufacturing process is within the aforementioned range, a sheet with excellent hot melt properties can be manufactured without the reaction advancing even if a silicone sheet containing a thermosetting composition is produced.

[Integration of Step 3 and Step 4]

For example, Step 3 and Step 4 can be continuous and integrated, for example, the heated and melted mixture obtained in Step 2 is laminated by being discharged or applied between the films having at least one release surface directly under the rollers, and at the same time, the film may be stretched and molded to a specific thickness by adjusting the gap between the rollers. Thus, a manufacturing method having a process in which Step 3 and Step 4 are substantially integrated is also included within the scope of the above manufacturing method.

In other words, Steps 3 and 4 may be carried out in a continuous and integrated manner, for example, a process in which the mixture obtained in Step 2 is discharged or applied between two release films to sandwich the aforementioned mixture between the two release films, such as between two long release films, and a process in which a laminated body comprising the two release films and the aforementioned mixture interposed therebetween is continuously passed between rolls to stretch and form the mixture between the release films to obtain a desired laminated body. Such a method in which Step 3 and Step 4 are performed in an integrated manner is also included in the above-described manufacturing method.

[Cutting Step]

Step 4 can obtain a releasable laminate body in which the curable silicone sheet is interposed between the releasable films, and may optionally include a step of cutting the laminate body containing the curable silicone sheet. Thereby, a releasable laminate body containing hot melt curable silicone sheet of a desired size can be obtained. A cutting device is not limited, but a device that can cut continuously in width and length directions is preferable, and the line speed is preferably adjustable. A sheet cutter manufactured by SOLUTECH can be used for continuous cutting. If the cutting device has a foreign material inspecting machine, foreign material can be detected, marked, and removed before cutting.

[Pass Line after Rotating Roller]

Furthermore, in step 4, a releasable laminate body in which a hot melt curable silicone sheet is interposed between releasable films is obtained. However, if a fluorosilicone coating treatment is used for the releasable film, adhesion to the silicone sheet tends to be very weak, and thus the film may peel off from the silicone sheet depending on the pass line after step 4. If there is an extreme U-shaped pass line, the film tends to peel off from the silicone sheet, and therefore, the pass line is preferably straight after the stretching rotating roller. For this reason, winding the film with a winding device or the like is preferably avoided before the cutting step, and the film is preferably continuously cut to a desired size in the cutting step.

[Optional Step for Quality Control or the Like]

With step 4, a sheet containing a hot melt curable silicone sheet is disposed between the releasable films to form a releasable laminate body, but thereafter, may and preferably includes a step for the purpose of quality control for practical purposes (such as a step of measuring characteristic values or controlling the presence of foreign material). The step is preferably performed a foreign material detecting device provided with optical measuring means such as a camera, video, or the like.

[Laminate Body]

The laminate body obtained by the aforementioned step is a laminate body, where an essentially flat, hot melt curable silicone sheet having a thickness of 10 to 2000 μm, containing at least organopolysiloxane resin fine particles, a curing agent and a functional filler, and optionally further containing a straight chain organopolysiloxane and another component, has a laminated structure between films with at least one release surface. Note that both of the films may be and are preferably provided with a release surface.

[Curable Silicone Sheet]

The curable silicone sheet obtained by the manufacturing method of the present invention is a curable silicone composition containing at least organopolysiloxane resin fine particles, a curing agent, and a functional filler, and optionally further containing a straight chain organopolysiloxane and another component, which has hot melt properties and can be used as a heat meltable pressure sensitive adhesive material to form a silicone cured product with excellent heat resistance and stress relaxation by curing. In particular, the curable silicone sheet has excellent formability, gap-filling properties and adhesive/pressure sensitive adhesive strength, and can be used as a die attach film and film adhesive. Furthermore, it can be preferably used as a curable silicone sheet to form a sealing layer by compression molding, press molding, or vacuum lamination. Regardless of the application of use, the curable silicone sheet is a sheet-like product with hot melt properties, and therefore, it can be preferably applied to adhesion and sealing of large areas.

Specifically, the curable silicone sheet obtained by the manufacturing method of the present invention, after being peeled from the release film, is arranged on a desired site of a semiconductor or the like, and a film adhesive layer is formed on an adherends utilizing the gap-filling properties with regard to unevenness and gaps, and is temporarily secured, arranged, and attached between adherends. Moreover, the curable silicone sheet may be heated to 150° C. or higher to adhere the adherends together by the cured product of the curable silicone sheet. Note that the releasable film may be released after the curable silicone sheet is heated to form a cured product, and this use is preferred when the film is used as a layer to seal a substrate such as a semiconductor or the like. The timing of peeling may be selected based on the application and use of the curable silicone sheet.

The curable silicone sheet is hot meltable, and therefore, flexibility or fluidity are provided by heating the sheet before final curing. For example, even if the adhering surface of the adherend is uneven, unevenness and gaps can be filled without voids to form an adhesive surface. Examples of heating means of the curable silicone sheet that can be used include various thermostatic baths, hot plates, electromagnetic heating devices, heating rollers, and the like. In order to perform more efficient adhering and heating, for example, an electric heat pressing machine, a diaphragm type laminator, a roller laminator, or the like is preferably used.

As described above, the curable silicone sheet according to the present invention excels in gap-filling properties at the time of melting and flexibility of the cured product at room temperature to high temperature, and therefore, the cured product can be very suitably used in a molding method including a coating process in which overmolding and underfilling of a semiconductor device including optical semiconductors are performed at the same time (so-called mold underfilling method). Furthermore, due to the characteristics described above, the composition can be suitably used in a molding method including a coating process (so-called wafer molding) in which the surface of a semiconductor wafer substrate on which a single or a plurality of semiconductor devices are mounted is covered and overmolded so that the gaps between the semiconductor devices are filled with the cured product.

In the above steps, a compression molding machine, an injection molding machine, an auxiliary ram molding machine, a slide molding machine, a double ram molding machine, a low pressure sealing molding machine, a heat press, a vacuum laminator, or the like can be used. In particular, the curable silicone sheet of the present invention can be preferably used for to obtain a cured product by press molding, compression molding, and vacuum lamination.

An optimum temperature can be selected as a condition for heat curing the curable silicone sheet based on a curing system thereof. In the case of hydrosilylation reaction, the temperature is preferably 150° C. or higher, and in the case of organic peroxide curing, the temperature is preferably 170° C. or higher.

Since it is suitable as a protective member for a semiconductor or the like, the cured product obtained by curing the curable silicone sheet according to the present invention preferably has a type-D durometer hardness of 20 or more at 25° C. This type-D durometer hardness is determined by the type-D durometer in accordance with the JIS K 6253-1997 "Hardness Testing Methods for Vulcanized Rubber and Thermoplastic Rubber".

Furthermore, since it is suitable as an encapsulant for semiconductors in flexible applications requiring flexibility, the flexural elongation of the cured product measured by the method specified in JIS K 6911-1995 "General Test Method for Thermosetting Plastics" should be 2% or more, or preferably 4% or more.

[Application of Curable Silicone Sheet of Present Invention]

The curable silicone sheet according to the present invention has hot melt properties, gap filling properties while melted (hot-melt), and has superior workability and curability, and is therefore preferable as an encapsulant or underfill agent for semiconductors; encapsulant or underfill agent for power semiconductors such as SiC, GaN, and the like; encapsulant or light reflecting material for optical semiconductors such as light emitting diodes, photodiodes, phototransistors, laser diodes, and the like; and electrical and electronic adhesive, potting agent, protecting agent, and coating agent. Since the composition has hot-melt properties, it is also suitable as a material for press molding, compression molding, or molding by vacuum lamination. In particular, it is suitable for use as an encapsulant for semiconductors that use the mold underfill method or the wafer molding method during molding.

In particular, the curable silicone sheets according to the present invention can be used for sealing a large area of a semiconductor substrate (including wafers and optical semiconductor substrates). Furthermore, a sheet formed from the curable granular silicone composition of the present invention can be used for die attach films, sealing flexible devices, stress relief layers for bonding two different substrates, and the like.

[Application of Cured Product of Curable Silicone Sheet of Present Invention]

Although the applications of the cured product of the present invention are not particularly limited, the composition of the present invention has hot-melt properties, superior moldability and gap-fill properties, and the cured product has the flexibility described above at room temperature, high stress relief properties, and flexural elongation. Therefore, the cured product obtained by curing the present composition can be suitably used as a member for a semiconductor device, and can be suitably used as an encapsulant for a semiconductor element including optical semiconductors, an IC chip or the like, a light reflection material for an optical semiconductor device, and as an adhesive/bonding member of a conductor device.

The semiconductor device equipped with a member made up of the cured product is not particularly limited, but is particularly preferred to be a power semiconductor device, an optical semiconductor device, or a semiconductor device mounted on a flexible circuit base.

[Curable Particulate Silicone Composition]

The curable silicone sheet of the present invention may contain a curable particulate silicone composition containing (A) organopolysiloxane resin fine particles, (B) a functional inorganic filler, and (C) a curing agent. Hereinafter, each component and optional component of the composition will be described. In the present invention, the term "average particle diameter" means the primary average particle diameter of the particles unless otherwise defined. Functional inorganic fillers with an average particle diameter of 10.0 µm or more may be described as "coarse particles".

Component (A) is organopolysiloxane resin microparticles, which is a base compound of this composition and is cured by the (C) curing agent. Here, component (A) preferably has a curing reactive functional group, and is one or more functional groups selected from a condensation reactive group, a hydrosilylation reactive group, a radical reactive group, and a peroxide curable group. However, a hydrosilylation reactive group or a radical reactive group are preferred, and in particular, a curing reactive functional group containing a carbon-carbon double bond is preferred.

Examples of the hydrosilylation reactive group in component (A) include an alkenyl group having 2 to 20 carbon atoms such as vinyl groups, allyl groups, butenyl groups, pentenyl groups, hexenyl groups, heptenyl groups, octenyl groups, nonenyl groups, decenyl groups, undecenyl groups, and dodecenyl groups, and a silicon atom bonded hydrogen atom. As the hydrosilylation reactive group, an alkenyl group is preferable. The alkenyl group may be linear or branched, and is preferably a vinyl group or a hexenyl group. Component (A) preferably has at least two hydrosilylation reactive groups in one molecule.

Examples of the group bonded to a silicon atom other than the hydrosilylation reactive group in component (A) include an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, an aralkyl group having 7 to 20 carbon atoms, an alkoxy group, and a hydroxyl group. Specific examples thereof include alkyl groups such as methyl, ethyl, propyl, butyl, pentyl, hexyl, heptyl, octyl, nonyl, decyl, undecyl, and dodecyl; aryl groups such as phenyl, tolyl, xylyl, naphthyl, anthracenyl, phenanthryl, and pyrenyl; aralkyl groups such as phenethyl and phenylpropyl; groups in which a part or all of the hydrogen atoms bonded to these groups are substituted with a halogen atom such as a chlorine atom and a bromine atom; and alkoxy groups such as methoxy, ethoxy, and propoxy. In particular, a phenyl group and a hydroxyl group are preferable.

Examples of radical reactive groups in component (A) include alkyl groups having 1 to 20 carbon atoms, such as methyl, ethyl, propyl, butyl, pentyl, hexyl, heptyl, octyl, nonyl, decyl, undecyl, and dodecyl; alkenyl groups having 2 to 20 carbon atoms, such as vinyl, allyl, butenyl, pentenyl, hexenyl, heptenyl, octenyl, nonenyl, decenyl, undecenyl, and dodecenyl; acryl-containing groups such as 3-acryloxypropyl and 4-acryloxybutyl; methacryl-containing groups such as 3-methacryloxypropyl and 4-methacryloxybutyl; and a silicon atom bonded hydrogen atom. As the radical reactive group, an alkenyl group is preferable. The alkenyl group may be linear or branched, and is preferably a vinyl group or a hexenyl group. Component (A) preferably has at least two radical reactive groups in one molecule.

Examples of the group bonded to a silicon atom other than the radical reactive group in component (A) include a halogen-substituted alkyl group having 1 to 20 carbon atoms, an aryl group having 6 to 20 carbon atoms, a halogen-substituted aryl group having 6 to 20 carbon atoms, an aralkyl group having 7 to 20 carbon atoms, an alkoxy group, and a hydroxyl group, and the same groups as those described above are exemplified. In particular, a phenyl group and a hydroxyl group are preferable. In particular, in component (A), it is preferable that 10 mol % or more of the total organic groups in the molecule be an aryl group, in particular, a phenyl group.

In the present invention, component (A) preferably includes organopolysiloxane resin microparticles having a curing reactive functional group, but said organopolysiloxane resin microparticles may be hot-meltable as a whole molecule, or may include organopolysiloxane resin microparticles that are not hot-meltable as a whole molecule. If the organopolysiloxane resin microparticles in question do not have hot-melt properties, they are preferably a mixture of straight or branched chain organopolysiloxane. Furthermore, organopolysiloxane resin particulates which do not have a curing reactive functional group and do not have hot melt properties as a whole molecule may be used in combination and are preferred.

In other words, at least some or all of component (A) may be (A1-1) a hot-meltable organopolysiloxane resin microparticle having a softening point of 30° C. or higher and having a curing reactive functional group containing at least one carbon-carbon double bond in the molecule.

On the other hand, the organopolysiloxane resin, which is component (A), may be an organopolysiloxane resin that does not itself have hot melt properties, and is particularly preferably one or more types selected from (A1-2-1) 100 parts by mass of an organopolysiloxane resin particulate having no hot-melt properties as a whole molecule, having a curing-reactive functional group containing at least one carbon-carbon double bond in the molecule, and containing at least 20 mol % or more of the total siloxane units represented by $SiO_{4/2}$, and (A1-2-2) an organopolysiloxane resin particulate having no hot-melt properties as a whole molecule, having a curing reactive functional group containing at least one carbon-carbon double bond in the molecule, and containing at least 20 mol % or more of the total siloxane units represented by $SiO_{4/2}$, or a mixture thereof. However, since these organopolysiloxane resins themselves do not have hot melt properties, there is need for a mixture with (A2) a straight chain or branched organopolysiloxane in a liquid or semi-solid form with plasticity at 25° C., having a curing-reactive functional group containing at least two carbon-carbon double bonds in a molecule.

Particularly preferably, the organopolysiloxane resin fine particles, which are component (A), contain a mixture of components (A1-2-1), (A1-2-2), and (A2), and the entire mixture is the fine particles containing a solid fraction having hot melt properties. These components are described hereinafter.

[Component (A1)]

Component (A1) has hot-melt properties by itself and has a curing reactive functional group containing at least one carbon-carbon double bond in the molecule, such that it is cured by the (C) curing agent described below. Such a component (A1) is preferably organopolysiloxane resin fine particles containing:

($A_1$) a resinous organopolysiloxane;

($A_2$) an organopolysiloxane crosslinked product obtained by crosslinking at least one type of organopolysiloxane;

($A_3$) a block copolymer composed of a resinous organosiloxane block and a chained organosiloxane block; or a mixture of at least two types thereof.

Component ($A_1$) is a resinous organopolysiloxane having a hydrosilylation reactive group and/or a radical reactive group, and is preferably a hot-melt resinous organopolysiloxane having a large number of T-units or Q-units and an aryl group. Examples of such a component ($A_1$) include MQ resins, MDQ resins, MTQ resins, MDTQ resins, TD resins, TQ resins, and TDQ resins consisting of any combination of: a triorganosiloxane unit (M unit) (the organo group is a methyl group only, a methyl group and a vinyl group, or a phenyl group); a diorganosiloxane unit (D unit) (the organo group is a methyl group only, a methyl group and a vinyl group, or a phenyl group); a monoorganosiloxane unit (T unit) (the organo group is a methyl group, a vinyl group, or a phenyl group); and a siloxy unit (Q unit). It is preferable that component ($A_1$) has at least two hydrosilylation reactive groups and/or radical reactive groups in the molecule, and 10 mol % or more of the total organic groups in the molecule is an aryl group, particularly, a phenyl group.

Since component ($A_2$) is formed by crosslinking at least one organopolysiloxane, cracks are not readily generated when the component is cured by the curing agent (C), and the curing shrinkage can be reduced. Here, "crosslinking" means linking the organopolysiloxane as a raw material by a hydrosilylation reaction, a condensation reaction, a radical reaction, a high energy ray reaction, or the like. Examples of the hydrosilylation reactive group and the radical reactive group (including the high energy ray reactive group) include the same groups as those described above, and examples of the condensation reactive group include a hydroxyl group, an alkoxy group, and an acyloxy group.

The unit constituting component ($A_2$) is not limited, and siloxane units and siloxane units containing silalkylene groups are exemplified, and it is preferable to have a resinous polysiloxane unit and a chained polysiloxane unit in the same molecule because they impart adequate hardness and mechanical strength to the obtained cured product. That is, component ($A_2$) is preferably a crosslinked product of a resinous organopolysiloxane and a chained organopolysiloxane (including a linear or branched chain organopolysiloxane). By introducing the resinous organopolysiloxane structure-chained organopolysiloxane structure into component ($A_2$), component ($A_2$) exhibits good hot-melt properties, and the curing agent (C) exhibits good curing properties.

Component ($A_2$) is any one of the following (1) to (3):

(1) One obtained by linking a resinous organopolysiloxane structure-chain organopolysiloxane structure in the molecule by an alkylene linkage via a hydrosilylation reaction of an organopolysiloxane having at least two alkenyl groups in one molecule and an organopolysiloxane having at least two silicon atom bonded hydrogen atoms in one molecule;

(2) One obtained by linking a resinous organopolysiloxane structure-chain organopolysiloxane structure in the molecule by a siloxane linkage or an alkylene linkage via a radical reaction of an organic peroxide of at least two organopolysiloxanes having at least two radical reactive groups in one molecule; or (3) One obtained by linking a resinous organopolysiloxane structure-chain organopolysiloxane structure in the molecule by a siloxane (—Si—O—Si—) linkage via a condensation reaction of at least two organopolysiloxanes.

Such component ($A_2$) has a structure in which organopolysiloxane moieties of the resin structure-chain structure are linked by an alkylene group or new siloxane linkage, so that hot-melt properties are remarkably improved.

In the above (1) and (2), as the alkylene group contained in component ($A_2$), an alkenyl group having 2 to 20 carbon atoms such as an ethylene group, a propylene group, a butylene group, a pentylene group, a hexylene group, or the like is exemplified, and these groups may be linear or branched, and are preferably an ethylene group or a hexylene group.

The crosslinked products of resinous organopolysiloxanes and chain organopolysiloxanes, including linear or branched chain organopolysiloxanes, are composed of, for example, the following siloxane units and siloxane units containing silalkylene groups:

M-units: siloxane units represented by $R^1R^2{}_2SiO_{1/2}$;

D-units: siloxane units represented by $R^1R^2SiO_{2/2}$;

$R^3M/R^3D$-units: at least one siloxane unit selected from a silalkylene group containing siloxane unit represented by $R^3{}_{1/2}R^2{}_2SiO_{1/2}$ and a silalkylene group containing siloxane unit represented by $R^3{}_{1/2}R^2SiO_{2/2}$; and T/Q-units: at least one siloxane unit selected from a siloxane unit represented by $R^2SiO_{3/2}$ and a siloxane unit represented by $SiO_{4/2}$.

In the formula, each $R^1$ is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, and the same groups as described above are exemplified. $R^1$ is preferably a methyl group, a vinyl group, or a phenyl group. However, it is preferable that at least two $R^1$ of all siloxane units are alkenyl groups.

In addition, in the formula, each $R^2$ is independently an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, or an aralkyl group having 7 to 20 carbon atoms, and the same groups as the $R^1$ are exemplified. $R^2$ is preferably a methyl group or a phenyl group.

In the formulae, $R^3$ is a linear or branched alkylene group having 2 to 20 carbon atoms bonded to a silicon atom in other siloxane units. As the alkylene group, the same groups as described above are exemplified, and an ethylene group and a hexylene group are preferable.

The M-unit is a siloxane unit constituting the terminal of component ($A_2$), and the D-unit is a siloxane unit constituting a linear polysiloxane structure. Note that it is preferable that an alkenyl group is present on the M-unit or the D-unit, in particular, the M-unit. On the other hand, the $R^3$M-unit and the $R^3$D-unit are siloxane units bonded to a silicon atom in another siloxane unit via a silalkylene linkage and bonded to a silicon atom in another siloxane unit via an oxygen atom. The T/Q-unit is a branched siloxane unit which gives a resinous structure to the polysiloxane, and component ($A_2$) preferably contains a siloxane unit represented by $R^2SiO_{3/2}$ and/or a siloxane unit represented by $SiO_{4/2}$. In particular, since the hot-melt properties of component ($A_2$) are improved and the content of the aryl group in component ($A_2$) is adjusted, it is preferable that component ($A_2$) contains a siloxane unit represented by $R^2SiO_{3/2}$, and in particular, it is preferable that component ($A_2$) contains a siloxane unit in which $R^2$ is a phenyl group.

The $R^3$M/$R^3$D-unit is one of the characteristic structures of component ($A_2$), and represents a structure in which silicon atoms are crosslinked via the alkylene group of $R^3$. Specifically, the $R^3$M/$R^3$D-unit is at least one siloxane unit selected from an alkylene group-containing siloxane unit represented by $R^3_{1/2}R^2_2SiO_{1/2}$ and an alkylene group-containing siloxane unit represented by $R^3_{1/2}R^2SiO_{2/2}$, and at least two of all siloxane units constituting component ($A_2$) are preferably these alkylene group-containing siloxane units. The preferred form of linkage between siloxane units having alkylene groups of $R^3$ is as described above, and the number of $R^3$ between two alkylene group-containing siloxane units is expressed as the linkage number "½" as is the number of oxygens and the like in the M-units. Assuming that the number of $R^3$ is 1, at least one selected from the structural units of siloxanes represented by $[O_{1/2}R^2_2SiR^3SiR^2_2O_{1/2}]$, $[O_{1/2}R^2_2SiR^3SiR^2O_{2/2}]$, and $[O_{2/2}R^2SiR^3SiR^2O_{2/2}]$ is contained in component ($A_2$), and each oxygen atom (O) is bonded to a silicon atom contained in the M, D, and T/Q-units. With such a structure, component ($A_2$) can relatively easily design a structure having a chain polysiloxane structure comprised of D-units and a resinous polysiloxane structure containing T/Q-units in the molecule, and the component is remarkably excellent in physical properties.

In the above (1), the component can be obtained by hydrosilylation reaction of an organopolysiloxane having at least two alkenyl groups in one molecule and an organopolysiloxane having at least two silicon atom bonded hydrogen atoms in one molecule at a reaction ratio of [number of moles of alkenyl groups]/[number of moles of silicon atom bonded hydrogen atoms]>1.

In the above (2), the component can be obtained by radical reaction of at least two organopolysiloxanes having at least two radical reactive groups in one molecule with an organic peroxide in an amount which is insufficient for all radical reactive groups in the system to react.

In the above (1) and (2), component (A2) is obtained by subjecting an organopolysiloxane having a resinous siloxane structure and an organopolysiloxane having a chain siloxane structure to a hydrosilylation reaction or a radical reaction.

For example, component ($A_2$) is an organopolysiloxane obtained by reacting:
($A^R$) at least one type of resinous organopolysiloxane containing a siloxane unit represented by $R^2SiO_{3/2}$ (where $R^2$ is the same group as described above) and/or a siloxane unit represented by $SiO_{4/2}$ in the molecule and having an alkenyl group with 2 to 20 carbon atoms or a silicon-bonded hydrogen atom or a radical reactive group; and
($A^L$) at least one type of chained organopolysiloxane ($A^L$) containing a siloxane unit represented by $R^2_2SiO_{2/2}$ (where $R^2$ is the same group as described above) in the molecule and having a group capable of a hydrosilylation reaction or a radical reaction with the component ($A^R$), the group being an alkenyl group with 2 to 20 carbon atoms or a silicon-bonded hydrogen atom,
at a ratio designed so that the hydrosilylation reactive group and/or radical reactive group in component ($A^R$) or component ($A^L$) remains after the reaction.

In the above (1), when at least a part of component ($A^R$) is a resinous organopolysiloxane having an alkenyl group of 2 to 20 carbon atoms, it is preferable that at least a part of component ($A^L$) is a chain organopolysiloxane having a silicon atom bonded hydrogen atom.

Similarly, when at least a part of component ($A^R$) is a resinous organopolysiloxane having a silicon atom bonded hydrogen atom, it is preferable that at least a part of component ($A^L$) is a chain organopolysiloxane having an alkenyl group of 2 to 20 carbon atoms.

Such a component (A2) is preferably:
component ($a_1$): a substance obtained by performing a radical reaction on an organopolysiloxane having at least two alkenyl groups with 2 to 20 carbon atoms in the molecule containing the component ($a_{1-1}$) below and/or the component ($a_{1-2}$) below, with an organic peroxide; or
a substance obtained by performing a hydrosilylation reaction on component ($a_1$) and ($a_2$) an organohydrogenpolysiloxane
in the presence of a hydrosilylation reaction catalyst in an amount such that the molar ratio of the silicon-bonded hydrogen atoms in the component ($a_2$) is from 0.2 to 0.7 mol with respect to the alkenyl groups having 2 to 20 carbon atoms included in the component ($a_1$).

Component ($a_{1-1}$) is polysiloxanes with relatively large amounts of branching units, and organopolysiloxanes having at least two alkenyl groups in one molecule, expressed by the average unit formula:

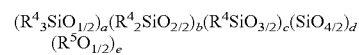
$(R^4_3SiO_{1/2})_a(R^4_2SiO_{2/2})_b(R^4SiO_{3/2})_c(SiO_{4/2})_d$
$(R^5O_{1/2})_e$ In the formula, each $R^4$ is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, and the same groups as the $R^1$ are exemplified. Preferably, $R^4$ is a methyl group, a vinyl group, or a phenyl group. Note that at least two of $R^4$ are alkenyl groups. In addition, since the hot-melt properties are good, it is preferable that 10 mol % or more, or 20 mol % or more of the total $R^4$ is a phenyl group. Furthermore, in the formula, $R^5$ is a hydrogen atom or an alkyl group having 1 to 6 carbon atoms, and the same alkyl groups as those described above are exemplified.

In the formula, a is a number within the range of 0 to 0.7, b is a number within the range of 0 to 0.7, c is a number within the range of 0 to 0.9, d is a number within the range of 0 to 0.7, e is a number within the range of 0 to 0.1, c+d is a number within the range of 0.3 to 0.9, and a+b+c+d is 1; preferably a is a number within the range of 0 to 0.6, b is a number within the range of 0 to 0.6, c is a number within the range of 0 to 0.9, d is a number within the range of 0 to 0.5, e is a number within the range of 0 to 0.05, c+d is a number within the range of 0.4 to 0.9, and a+b+c+d is 1. This is because the hardness and mechanical strength of the obtained cured product are excellent when a, b, and c+d are each a number within the above range.

The following organopolysiloxanes are examples of such a component $(a_{1-1})$. In the formula, Me, Ph, and Vi represent a methyl group, a phenyl group, and a vinyl group, respectively.

$(ViMe_2SiO_{1/2})_{0.25}(PhSiO_{3/2})_{0.75}(HO_{1/2})_{0.02}$ $(ViMe_2SiO_{1/2})_{0.25}(PhSiO_{3/2})_{0.75}$ $(ViMe_2SiO_{1/2})_{0.20}(PhSiO_{3/2})_{0.80}$ $(ViMe_2SiO_{1/2})_{0.15}(Me_3SiO_{1/2})_{0.38}(SiO_{4/2})_{0.47}(HO_{1/2})_{0.01}$ $(ViMe_2SiO_{1/2})_{0.13}(Me_3SiO_{1/2})_{0.45}(SiO_{4/2})_{0.42}(HO_{1/2})_{0.01}$ $(ViMe_2SiO_{1/2})_{0.15}(PhSiO_{3/2})_{0.85}(HO_{1/2})_{0.01}$ $(Me_2SiO_{2/2})_{0.15}(MeViSiO_{2/2})_{0.10}(PhSiO_{3/2})_{0.75}(HO_{1/2})_{0.04}$ $(MeViPhSiO_{1/2})_{0.20}(PhSiO_{3/2})_{0.80}(HO_{1/2})_{0.05}$ $(ViMe_2SiO_{1/2})_{0.15}(PhSiO_{3/2})_{0.75}(SiO_{4/2})_{0.10}(HO_{1/2})_{0.02}$ $(Ph_2SiO_{2/2})_{0.25}(MeViSiO_{2/2})_{0.30}(PhSiO_{3/2})_{0.45}(HO_{1/2})_{0.04}$ $(Me_3SiO_{1/2})_{0.20}(ViMePhSiO_{1/2})_{0.40}(SiO_{4/2})_{0.40}(HO_{1/2})_{0.08}$

Component $(a_{1-2})$ is polysiloxanes with relatively large amounts of chain siloxane units, and organopolysiloxanes having at least two alkenyl groups in one molecule, expressed by the average unit formula:

$(R^4{}_3SiO_{1/2})_{a'}(R^4{}_2SiO_{2/2})_{b'}(R^4SiO_{3/2})_{c'}(SiO_{4/2})_{d'}(R^5O_{1/2})_{e'}$

In the formula, $R^4$ and $R^5$ are the same groups as described above.

In the formula, a' is a number within the range of 0.01 to 0.3, b' is a number within the range of 0.4 to 0.99, c' is a number within the range of 0 to 0.2, d' is a number within the range of 0 to 0.2, e' is a number within the range of 0 to 0.1, c'+d' is a number within the range of 0 to 0.2, and a'+b'+c'+d' is 1; preferably a' is a number within the range of 0.02 to 0.20, b' is a number within the range of 0.6 to 0.99, c' is a number within the range of 0 to 0.1, d' is a number within the range of 0 to 0.1, j' is a number within the range of 0 to 0.05, c'+d' is a number within the range of 0 to 0.1, and a'+b'+c'+d' is 1. This is because if a', b', c', and d' are each a number within the above range, the obtained cured product can be imparted with toughness.

As such a component $(a_{1-2})$, the following organopolysiloxanes are exemplified. In the formula, Me, Ph, and Vi represent a methyl group, a phenyl group, and a vinyl group, respectively.

$ViMe_2SiO(MePhSiO)_{18}SiMe_2Vi$, i.e., $(ViMe_2SiO_{1/2})_{0.10}(MePhSiO_{2/2})_{0.90}$ $ViMe_2SiO(MePhSiO)_{30}SiMe_2Vi$, in other words, $(ViMe_2SiO_{1/2})_{0.063}(MePhSiO_{2/2})_{0.937}$ $ViMe_2SiO(MePhSiO)_{150}SiMe_2Vi$, in other words, $(ViMe_2SiO_{1/2})_{0.013}(MePhSiO_{2/2})_{0.987}$ $ViMe_2SiO(Me_2SiO)_{18}SiMe_2Vi$, i.e., $(ViMe_2SiO_{1/2})_{0.10}(Me_2SiO_{2/2})_{0.90}$ $ViMe_2SiO(Me_2SiO)_{30}SiMe_2Vi$, in other words, $(ViMe_2SiO_{1/2})_{0.063}(Me_2SiO_{2/2})_{0.937}$ $ViMe_2SiO(Me_2SiO)_{35}(MePhSiO)_{13}SiMe_2Vi$, i.e., $(ViMe_2SiO_{1/2})_{0.04}(Me_2SiO_{2/2})_{0.70}(MePhSiO_{2/2})_{0.26}$ $ViMe_2SiO(Me_2SiO)_{10}SiMe_2Vi$, in other words, $(ViMe_2SiO_{1/2})_{0.17}(Me_2SiO_{2/2})_{0.83}$ $(ViMe_2SiO_{1/2})_{0.10}(MePhSiO_{2/2})_{0.80}(PhSiO_{3/2})_{0.10}(HO_{1/2})_{0.02}$ $(ViMe_2SiO_{1/2})_{0.20}(MePhSiO_{2/2})_{0.70}(SiO_{4/2})_{0.10}(HO_{1/2})_{0.01}$ $HOMe_2SiO(MeViSiO)_{20}SiMe_2OH$ $Me_2ViSiO(MePhSiO)_{30}SiMe_2Vi$ $Me_2ViSiO(Me_2SiO)_{150}SiMe_2Vi$ Component $(a_{1-1})$ is preferably used from the viewpoint of imparting hardness and mechanical strength to the obtained cured product. Component $(a_{1-2})$ can be added as an optional component from the viewpoint of imparting toughness to the obtained cured product, but when a crosslinking agent having many chained siloxane units is used in the following component $(a_2)$, it may be used instead. In any case, it is preferable that the mass ratio of the component having a large number of branched siloxane units to the component having a large number of chained siloxane units is within the range of 50:50 to 100:0, or within the range of 60:40 to 100:0. This is because the hardness and mechanical strength of the obtained cured product are good when the mass ratio of the component having a large number of branched siloxane units to the component having a large number of chained siloxane units is within the above range.

When component $(a_1)$ is radically reacted by an organic peroxide, component $(a_{1-1})$ and component $(a_{1-2})$ may be reacted within the range of 10:90 to 90:10, and component $(a_2)$ may not be used.

Component $(a_2)$ is a component for crosslinking component $(a_{1-1})$ and/or component $(a_{1-2})$ in the hydrosilylation reaction, and is an organopolysiloxane containing at least two silicon atom bonded hydrogen atoms in one molecule. As a group bonded to a silicon atom other than a hydrogen atom in component $(a_2)$, an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, an aralkyl group having 7 to 20 carbon atoms, an alkoxy group, an epoxy group-containing group, or a hydroxyl group is exemplified, and the same groups as those described above are exemplified.

Such component ($a_2$) is not limited, but preferably is an organohydrogenpolysiloxane, represented by the average composition formula:

$$R^6_k H_m SiO_{(4-k-m)/2}$$

In the formulae, $R^6$ is an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, or an aralkyl group having 7 to 20 carbon atoms, and the same groups as the above $R^1$ are exemplified, and are preferably a methyl group or a phenyl group.

In the formula, k is a number in the range of 1.0 to 2.5, preferably in the range of 1.2 to 2.3, m is a number in the range of 0.01 to 0.9, preferably in the range of 0.05 to 0.8, and k+m is a number in the range of 1.5 to 3.0, preferably in the range of 2.0 to 2.7.

Component ($a_2$) may be a resinous organohydrogenpolysiloxane having a large number of branched siloxane units, or the component may be a chained organohydrogenpolysiloxane having a large number of chained siloxane units. Specifically, examples of component ($a_2$) include an organohydrogenpolysiloxane represented by the following ($a_{2-1}$), an organohydrogenpolysiloxane represented by the following ($a_{2-2}$), or mixtures thereof.

Component ($a_{2-1}$) is a resin-like organopolysiloxane having a silicon-bonded hydrogen atom, expressed by the average unit formula:

$$[R^7_3SiO_{1/2}]_f[R^7_2SiO_{2/2}]_g[R^7SiO_{3/2}]_h[SiO_{4/2}]_i(R^5O_{1/2})_j$$

In the formula, each $R^7$ is independently an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, an aralkyl group having 7 to 20 carbon atoms, or a hydrogen atom, and the same groups as the above $R^1$ are exemplified. Furthermore, in the formula, $R^5$ represents a hydrogen atom or an alkyl group having 1 to 6 carbon atoms, and the same groups as described above are exemplified.

In the formula, f is a number within the range of 0 to 0.7, g is a number within the range of 0 to 0.7, h is a number within the range of 0 to 0.9, i is a number within the range of 0 to 0.7, j is a number within the range of 0 to 0.1, h+i is a number within the range of 0.3 to 0.9, and f+g+h+i is 1; preferably f is a number within the range of 0 to 0.6, g is a number within the range of 0 to 0.6, h is a number within the range of 0 to 0.9, i is a number within the range of 0 to 0.5, j is a number within the range of 0 to 0.05, h+i is a number within the range of 0.4 to 0.9, and f+g+h+i+i is 1.

Component ($a_{2-2}$) is an organopolysiloxane having at least two silicon atom bonded hydrogen atoms in one molecule, expressed by the average unit formula:

$$(R^7_3SiO_{1/2})_{f'}(R^7_2SiO_{2/2})_{g'}(R^7SiO_{3/2})_{h'}(SiO_{4/2})_{i'}(R^5O_{1/2})_{j'}$$

In the formula, $R^7$ and $R^5$ are the same groups as described above.

In the formula, f' is a number within the range of 0.01 to 0.3, g' is a number within the range of 0.4 to 0.99, h' is a number within the range of 0 to 0.2, i' is a number within the range of 0 to 0.2, j' is a number within the range of 0 to 0.1, h'+i' is a number within the range of 0 to 0.2, and f'+g'+h'+i' is 1; preferably f' is a number within the range of 0.02 to 0.20, g' is a number within the range of 0.6 to 0.99, h' is a number within the range of 0 to 0.1, i' is a number within the range of 0 to 0.1, j' is a number within the range of 0 to 0.05, h'+i' is a number within the range of 0 to 0.1, and f'+g'+h'+i' is 1.

As described above, in component ($a_2$), the resinous organopolysiloxane having many branched siloxane units imparts hardness and mechanical strength to the cured product, and the obtained organopolysiloxane having many chained siloxane units imparts toughness to the cured product, and therefore, it is preferable to appropriately use component ($a_{2-1}$) and component ($a_{2-2}$) as component ($a_2$). Specifically, when the number of branched siloxane units in component ($a_1$) is small, it is preferable to mainly use component ($a_{2-1}$) as component ($a_2$), and when the number of chained siloxane units in component ($a_1$) is small, it is preferable to mainly use component ($a_{2-2}$). Component ($a_2$) preferably has a mass ratio of component ($a_{2-1}$) to component ($a_{2-2}$) within the range of 50:50 to 100:0, or within the range of 60:40 to 100:0.

As component ($a_2$), the following organopolysiloxanes are exemplified. In the formula, Me and Ph represent a methyl group and a phenyl group, respectively.

$Ph_2Si(OSiMe_2H)_2$, i.e., $Ph_{0.67}Me_{1.33}H_{0.67}SiO_{0.67}$ $HMe_2SiO(Me_2SiO)_{20}SiMe_2H$, i.e., $Me_{2.00}H_{0.09}SiO_{0.95}$ $HMe_2SiO(Me_2SiO)_{55}SiMe_2H$, in other words, $Me_{2.00}H_{0.04}SiO_{0.98}$ $PhSi(OSiMe_2H)_3$, i.e., $Ph_{0.25}Me_{1.50}H_{0.75}SiO_{0.75}$ $(HMe_2SiO_{1/2})_{0.6}(PhSiO_{3/2})_{0.4}$, i.e., $Ph_{0.40}Me_{1.20}H_{0.60}SiO_{0.90}$ The amount of component ($a_2$) to be added is such that the molar ratio of silicon atom bonded hydrogen atoms in component ($a_2$) to the alkenyl groups in component ($a_1$) is in an amount of 0.2 to 0.7, preferably in an amount of 0.3 to 0.6. This is because the hardness and the mechanical strength of the obtained cured product are good when the amount of component ($a_2$) to be added is within the above ranges.

The organic peroxide used for radically reacting component ($a_1$) is not limited, and the organic peroxides exemplified by component (C) below can be used. In the radical reaction, component ($a_1$) is preferably a mixture of component ($a_{1-1}$) and component ($a_{1-2}$) in the mass ratio ranging from 10:90 to 90:10. Although the amount of the organic peroxide to be added is not limited, it is preferably within the range of 0.1 to 5 parts by mass, within the range of 0.2 to 3 parts by mass, or within the range of 0.2 to 1.5 parts by mass based on 100 parts by mass of component ($a_1$).

The hydrosilylation reaction catalyst used for the hydrosilylation reaction of component ($a_1$) and component ($a_2$) is not limited, and a hydrosilylation reaction catalyst exemplified by component (C) below can be used. The amount of the hydrosilylation reaction catalyst to be added is preferably an amount in which platinum-based metal atoms in the hydrosilylation reaction catalyst are within the range of 0.01 to 500 ppm, within the range of 0.01 to 100 ppm, or within the range of 0.01 to 50 ppm in terms of mass units, with regard to the total amount of component ($a_1$) and component ($a_2$).

The above component ($A_3$) is obtained by condensing the following component ($a_3$) and the following component ($a_4$) with a condensation reaction catalyst.

Component ($a_3$) is a condensation reactive organopolysiloxane, expressed by the average unit formula:

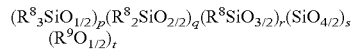
$(R^8{}_3SiO_{1/2})_p(R^8{}_2SiO_{2/2})_q(R^8SiO_{3/2})_r(SiO_{4/2})_s$
$(R^9O_{1/2})_t$ In the formula, each $R_8$ is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, and the same groups as described above are exemplified. Furthermore, in the formula, $R^9$ is a hydrogen atom, an alkyl group having 1 to 6 carbon atoms, or an acyl group having 2 to 5 carbon atoms, and an alkoxy group such as a methoxy group or an ethoxy group and an acyloxy group are exemplified. Component ($a_3$) has at least one silicon-bonded hydroxyl group, silicon-bonded alkoxy group, or silicon-bonded acyloxy group in one molecule. In addition, it is preferable that in one molecule, at least two $R^8$ is an alkenyl group, and 10 mol % or more, or 20 mol % or more of the total $R^8$ is a phenyl group.

In the formula, p is a number within the range of 0 to 0.7, q is a number within the range of 0 to 0.7, r is a number within the range of 0 to 0.9, s is a number within the range of 0 to 0.7, t is a number within the range of 0.01 to 0.10, r+s is a number within the range of 0.3 to 0.9, and p+q+r+s is 1; and preferably p is a number within the range of 0 to 0.6, q is a number within the range of 0 to 0.6, r is a number within the range of 0 to 0.9, s is a number within the range of 0 to 0.5, t is a number within the range of 0.01 to 0.05, and r+s is a number within the range of 0.4 to 0.9. This is because, when p, q, and r+s are each a number within the above range, a hot-melt silicone having flexibility at 25° C. but non-fluidity, low surface tack, and sufficiently low melt viscosity at high temperature is obtained.

Component ($a_4$) is a condensation reactive organopolysiloxane, expressed by the average unit formula:

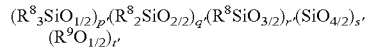
$(R^8{}_3SiO_{1/2})_{p'}(R^8{}_2SiO_{2/2})_{q'}(R^8SiO_{3/2})_{r'}(SiO_{4/2})_{s'}$
$(R^9O_{1/2})_{t'}$ In the formula, $R^8$ and $R^9$ are the same groups as described above. Component ($a_4$) has at least one silicon-bonded hydroxyl group, silicon-bonded alkoxy group, or silicon-bonded acyloxy group in one molecule. In the formula, p' is a number within the range of 0.01 to 0.3, q' is a number within the range of 0.4 to 0.99, r' is a number within the range of 0 to 0.2, s' is a number within the range of 0 to 0.2, t' is a number within the range of 0 to 0.1, r'+s' is a number within the range of 0 to 0.2, and p'+q'+r'+s' is 1; preferably p' is a number within the range of 0.02 to 0.20, q' is a number within the range of 0.6 to 0.99, r' is a number within the range of 0 to 0.1, s' is a number within the range of 0 to 0.1, t' is a number within the range of 0 to 0.05, and r'+s' is a number within the range of 0 to 0.1. This is because, when p', q', r', and s' are each a number within the above range, a hot-melt silicone having flexibility at 25° C. but non-fluidity, low surface tack, and sufficiently low melt viscosity at high temperature is obtained.

The condensation reaction catalyst for condensation reaction of component ($a_3$) and component ($a_4$) is not limited, and examples thereof include organic tin compounds such as dibutyltin dilaurate, dibutyltin diacetate, tin octenate, dibutyltin dioctate, and tin laurate; organic titanium compounds such as tetrabutyl titanate, tetrapropyl titanate, and dibutoxy bis(ethyl acetoacetate); acidic compounds such as hydrochloric acid, sulfuric acid, and dodecylbenzene sulfonic acid; alkaline compounds such as ammonia and sodium hydroxide; and amine-based compounds such as 1,8-diazabicyclo[5.4.0]undecene (DBU), 1,4-diazabicyclo[2.2.2]octane (DABCO), and preferably an organic tin compound, and an organic titanium compound.

Component ($A_3$) is a block copolymer composed of a resinous organosiloxane block and a chained organosiloxane block. Such component ($A_3$) is preferably comprised of 40 to 90 mol % of disiloxy units of the formula $[R^1{}_2SiO_{2/2}]$, 10 to 60 mol % of trisiloxy units of the formula $[R^1SiO_{3/2}]$, and preferably contains 0.5 to 35 mol % of silanol groups [≡SiOH]. Here, each $R^1$ is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, and the same groups as described above are exemplified. At least two $R^1$ in one molecule is an alkenyl group. Further, component ($A_3$) is a resinous organosiloxane block copolymer in which the disiloxy unit $[R^1{}_2SiO_{2/2}]$ forms a linear block having on average 100 to 300 disiloxy units per one linear block; the trisiloxy unit $[R^1SiO_{3/2}]$ forms a non-linear block having a molecular weight of at least 500 g/mol; at least 30% of the non-linear blocks are bonded to each other; each linear block is bonded to at least one non-linear block via a —Si—O—Si— linkage; the resinous organosiloxane block copolymer having a mass-average molecular weight of at least 20000 g/mol, and containing at least one alkenyl group of 0.5 to 4.5 mol %.

Component ($A_3$) is prepared by condensation reaction of ($a_5$) a resinous organosiloxane or a resinous organosiloxane block copolymer with ($a_6$) a chained organosiloxane, and optionally ($a_7$) a siloxane compound.

Component ($a_5$) is a resinous organopolysiloxane, expressed by the average unit formula:

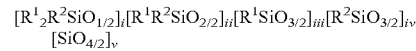
$[R^1{}_2R^2SiO_{1/2}]_i[R^1R^2SiO_{2/2}]_{ii}[R^1SiO_{3/2}]_{iii}[R^2SiO_{3/2}]_{iv}$
$[SiO_{4/2}]_v$ In the formula, each $R^1$ is independently an alkyl group having 1 to 20 carbon atoms, a halogen-substituted alkyl group having 1 to 20 carbon atoms, an alkenyl group having 2 to 20 carbon atoms, an aryl group having 6 to 20 carbon atoms, a halogen-substituted aryl group having 6 to 20 carbon atoms, or an aralkyl group having 7 to 20 carbon atoms, and the same groups as described above are exemplified. In addition, in the formula, each $R^2$ is independently an alkyl group having 1 to 20 carbon atoms, a halogen-substituted alkyl group having 1 to 20 carbon atoms, an aryl group having 6 to 20 carbon atoms, a halogen-substituted aryl group having 6 to 20 carbon atoms, or an aralkyl group having 7 to 20 carbon atoms, and the same groups as the $R^1$ are exemplified.

Also, in the formula, i, ii, iii, iv, and v represent the mole fraction of each siloxy unit, i is a number from 0 to 0.6, ii is a number from 0 to 0.6, iii is a number from 0 to 1, iv is a number from 0 to 1, and v is a number from 0 to 0.6, with the proviso that (ii+iii+iv+v)>0 and (i+ii+iii+iv+v)≤1. In addition, component ($a_5$) preferably contains 0 to 35 mol % of a silanol group [≡SiOH] in one molecule.

Component ($a_6$) is a straight-chain organosiloxane expressed by general formula:

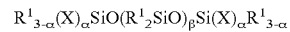
$R^1{}_{3-\alpha}(X)_\alpha SiO(R^1{}_2SiO)_\beta Si(X)_\alpha R^1{}_{3-\alpha}$ In the formula, $R^1$ is the same as described above, and the same groups as described above are exemplified. In addition, in the formula, X is a hydrolyzable group selected from —OR$^5$, F, Cl, Br, I, —OC(O)R$^5$, —N(R$^5$)$_2$, or —ON=CR$^5{}_2$, (wherein R$^5$ is a hydrogen atom or an alkyl group having 1 to 6 carbon atoms). Furthermore, in the formula, α is independently 1, 2, or 3, and β is an integer of 50 to 300.

Component (a$_7$) is a siloxane compound expressed by general formula:

R$^1$R$^2{}_2$SiX

In the formula, R$^1$, R$^2$, and X are the same groups as described above.

The condensation reaction catalyst for condensation reaction of component (a$_5$) and component (a$_6$) and/or component (a$_7$) is not limited, and examples thereof include organic tin compounds such as dibutyltin dilaurate, dibutyltin diacetate, tin octenate, dibutyltin dioctate, and tin laurate; organic titanium compounds such as tetrabutyl titanate, tetrapropyl titanate, and dibutoxy bis(ethyl acetoacetate); acidic compounds such as hydrochloric acid, sulfuric acid, and dodecylbenzene sulfonic acid; alkaline compounds such as ammonia and sodium hydroxide; and amine-based compounds such as 1,8-diazabicyclo[5.4.0]undecene (DBU), 1,4-diazabicyclo[2.2.2]octane (DABCO).

[Component (A1-2-1)]

Component (A1-2-1) of the present invention is a non-hot-meltable organopolysiloxane resin which does not have a curing reactive functional group containing a carbon-carbon double bond in its molecule. This component is soluble in organic solvents and is industrially synthesized in organic solvents.

Component (A1-2-1) is an organopolysiloxane resin microparticle that is a siloxane unit represented by SiO$_{4/2}$ making up at least 20 mol % or more of the total siloxane units, does not have hot melt properties as a whole molecule, and does not have a curing reactive functional group containing a carbon-carbon double bond in the molecule. By using this component as part of component (A1) in combination with component (A2), a straight or branched chain organopolysiloxane, within a predetermined quantitative range, the hot melt properties of the entire composition are improved.

Component (A1-2-1) is an organopolysiloxane resin that does not have hot-melt properties as a whole molecule and is solid in a solvent-free state. Here, the absence of a hot-melt property means that the resin, which is component (A1-2-1), does not exhibit heating and melting behavior independently, and specifically means that it does not have a softening point and melt viscosity.

The functional group bonded to the silicon atom in component (A1-2-1) is suitably a methyl group, and 70 mol % or more of the functional group bonded to all the silicon atoms is preferably a methyl group, more preferable that 80 mol % or more is a methyl group, and in particular, preferably 88 mol % or more is a methyl group. In such a range, component (A1-2-1) can be designed, not as a hot-melt component, but as a component that is particularly superior in coloration resistance, and the like at high temperatures of the cured product. A small amount of a hydroxyl group or an alkoxy group may be included in said component (A).

Since component (A1-2-1) does not have a curing-reactive group having a carbon-carbon double bond in the molecule, it does not form a cured product by itself. However, it has a reinforcing effect on the cured product and improves the hot melt properties of the composition as a whole.

Component (A1-2-1) is an organopolysiloxane resin microparticle that is solid in a solvent-free state, and is a siloxane unit represented by SiO$_{4/2}$ making up at least 20 mol % or more of the total siloxane units, which is a branched siloxane unit, in the molecule. Suitably, the siloxane units are at least 40 mol % of the total siloxane units, and the siloxane units are preferably 50 mol % or more, and particularly preferably in the range of 50 to 65 mol %.

Suitably, component (A1-2-1) is an organopolysiloxane resin not having any hot-melt properties, as expressed by the following average unit formula:

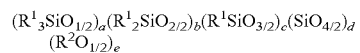

$(R^1{}_3SiO_{1/2})_a(R^1{}_2SiO_{2/2})_b(R^1SiO_{3/2})_c(SiO_{4/2})_d$
$(R^2O_{1/2})_e$ (In the formula, each R$^1$ independently has from 1 to 10 carbon atoms and is a monovalent hydrocarbon group that does not contain carbon-carbon double bonds; each R$^2$ is a hydrogen atom or an alkyl group having 1 to 10 carbon atoms; and a, b, c, d, and e are numbers satisfying the following: 0.10≤a≤0.60, 0≤b≤0.70, 0≤c≤0.80, 0.20≤d≤0.65, 0≤e≤0.05, and a+b+c+d=1).

In the above average unit formula, each R$^1$ independently has from 1 to 10 carbon atoms, and is a monovalent hydrocarbon group that does not contain any carbon-carbon double bonds, such as methyl, ethyl, propyl, butyl, pentyl, hexyl, heptyl, or similar alkyl group; phenyl, tolyl, xylyl, or similar aryl group; benzyl, phenethyl, or similar aralkyl group; and chloromethyl, 3-chloropropyl, 3,3,3-trifluoropropyl, or similar alkyl halide group; and the like. Herein, from the viewpoint of industrial production and the technical effect of the invention, 70 mol % or more of all R$^1$ in one molecule is preferably an alkyl group having 1 to 10 carbon atoms, such as a methyl group, and particularly preferable that 88 mol % or more is a methyl group. On the other hand, R$^1$ is preferably substantially free of an aryl group such as a phenyl group. If a large amount of aryl groups such as phenyl groups is contained, component (A1-2-1) itself may become hot-meltable, and thus the coloration resistance of the cured product at high temperatures may deteriorate.

In the formula, R$^2$ is an alkyl group having a hydrogen atom or 1 to 10 carbon atoms. Examples of the alkyl group for R$^2$ include methyl, ethyl, propyl, butyl, pentyl or hexyl. The relevant functional group R$^2$O$_{1/2}$ containing R$^2$ corresponds to the hydroxyl group or alkoxy group in component (A2-1-1).

In the formula, "a" is a number indicating the percentage of siloxane units in the general formula: R$^1{}_3$SiO$_{1/2}$. This number satisfies 0.1≤a≤0.60, preferably 0.15≤a≤0.55. If a is at or above the lower limit of the aforementioned range, then the composition containing the component, the composition as a whole can achieve favorable hot melt properties. On the other hand, if a is less than or equal to the upper limit of the aforementioned range, the mechanical strength (hardness, and the like) of the cured product obtained is not too low.

In the formula, "b" is a number indicating the percentage of siloxane units in the general formula: R$^1{}_2$SiO$_{2/2}$. This number satisfies 0≤b≤0.70, preferably 0≤b≤0.60. If b is less than or equal to the upper limit of the range, the composition containing the component can achieve favorable hot melt performance as a whole composition and a granular composition with little stickiness at room temperature can be obtained. In the present invention, b may be and is preferred to be 0.

In the formula, "c" is a number indicating the percentage of siloxane units in the general formula: R$^1$SiO$_{3/2}$. This number is given by 0≤c≤0.70 and preferably satisfies 0≤c≤0.60. If c is less than or equal to the upper limit of the range, the composition containing the component can achieve favorable hot melt performance as an entire composition and a granular composition with little stickiness at room temperature can be obtained. In the present invention, c may be and is preferred to be 0.

In the formula, d is the ratio of $SiO_{4/2}$ siloxane units, and must be such that $0.20 \leq d \leq 0.65$, but $0.40 \leq d \leq 0.65$ is preferable, and $0.50 \leq d \leq 0.65$ is particularly preferable.

Within this numerical range, the composition containing this component can achieve favorable hot melt performance as a whole, excellent mechanical strength of the resulting cured product, and good workability without stickiness as a whole.

In the formula, "e" is a number indicating the percentage of units in the general formula: $R^2O_{1/2}$, wherein the units are a hydroxyl group or alkoxy group bonded to a silicon atom that can be contained in the organopolysiloxane resin. This number satisfies $0 \leq e \leq 0.05$, preferably $0 \leq e \leq 0.03$. If e is below the upper limit of the range, a material that achieves favorable hot melt performance as a whole composition can be obtained. Note that the sum of a, b, c and d, which is the sum of each of the siloxane units, is equal to 1.

Component (A1-2-1) is an organopolysiloxane resin having the characteristics described above, and from the perspective of handleability, is suitably a spherical organopolysiloxane resin microparticle having an average primary particle diameter of 1 to 20 μm as measured by a laser diffraction/scattering method or the like. By using such a particulate component, the composition can be prepared or produced as a curable granular composition having superior handling workability and hot-melt properties. Here, the method of manufacturing component (A1-2-1) is as described above.

[Component (A1-2-2)]

Component (A1-2-2) of the present invention are organopolysiloxane resin fine particles having no hot-melt properties as a whole molecule, having a curing reactive functional group containing at least one carbon-carbon double bond in the molecule, and containing at least 20 mol % or more of the total siloxane units represented by $SiO_{4/2}$. This component is soluble in organic solvents and is industrially synthesized in organic solvents.

Unlike component (A1-2-1), component (A1-2-2) has a curing-reactive functional group containing at least one carbon-carbon double bond in a molecule, and particularly preferably has an alkenyl group. Component (A1-2-2) itself, together with the curing agent, is involved in the curing reaction to form a cured product.

Component (A1-2-2) is an organopolysiloxane resin that is solid in a solvent-free state, and is a siloxane unit represented by $SiO_{4/2}$ making up at least 20 mol % or more of the total siloxane units, which is a branched siloxane unit, in the molecule. Suitably, the siloxane units are at least 40 mol % of the total siloxane units, and the siloxane units are preferably 50 mol % or more, and particularly preferably in the range of 50 to 65 mol %. Other than having a curing-reactive functional group in a molecule, the structure of component (A 1-2-2) is generally the same as that of component (A1-2-1).

Component (A1-2-2) is an organopolysiloxane resin having the characteristics described above, and from the perspective of handleability, is suitably a spherical organopolysiloxane resin microparticle having an average primary particle diameter of 1 to 20 μm as measured by a laser diffraction/scattering method or the like. By using such a particulate component, the composition can be prepared or produced as a curable granular composition having superior handling workability and hot-melt properties. In the case where both components (A1-2-1) and (A1-2-2) are used, these two components can be mixed in an organic solvent before being used as mixed organopolysiloxane resin fine particles.

Suitably, component (A1) of the present invention is particularly preferably a mixture of (A1-2-1) 100 parts by mass of an organopolysiloxane resin particulate having no hot-melt properties as a whole molecule, having a curing-reactive functional group containing at least one carbon-carbon double bond in the molecule, and containing at least 20 mol % or more of the total siloxane units represented by $SiO_{4/2}$, or (A2-2-2) 0 to 600 parts by mass of an organopolysiloxane resin particulate having no hot-melt properties as a whole molecule, having a curing-reactive functional group containing at least one carbon-carbon double bond in the molecule, and containing at least 20 mol % or more of the total siloxane units represented by $SiO_{4/2}$.

[Component (A2)]

Component (A2) is one of the base compounds of the composition used together with component (A1), and is a straight chain or branched organopolysiloxane that is liquid or a semi-solid with plasticity at 25° C. and has a curing reactive functional group containing at least two carbon-carbon double bonds in the molecule. This manner of curing reactive chain-like organopolysiloxane is particularly preferably the solid organopolysiloxane resin described above, and when the aforementioned components (A1-2-1) and (A1-2-2) are mixed, develops hot melt properties as a whole mixture.

Component (A2) preferably has a curing-reactive group having a carbon-carbon double bond in the molecule. This type of a curing-reactive group is a hydrosilylation reactive, radical reactive, or a organic peroxide curing functional group that forms a cured product based on a crosslinking reaction with other components. This manner of curing-reactive group is an alkenyl group or an acrylic group, and examples are the same groups described above, and a vinyl group or a hexenyl group are in particular preferable.

Component (A2) is a straight chain or branched organopolysiloxane in a liquid state or semi-solid form with plasticity at 25° C. (room temperature), and when mixed with component (A1) in a solid state at room temperature, the composition as a whole exhibits hot melt-ability. Its structure can be based on a branched-chain organopolysiloxane having a small number of branched siloxane units (for example, T units represented by the general formula: $R^4SiO_{3/2}$ ($R^4$ is independently a monovalent hydrocarbon group having 1 to 10 carbon atoms) or Q units represented by $SiO_{4/2}$), and is suitably a straight-chain diorganopolysiloxane as expressed by the following structural formula (A2-1):

(In the formula, each $R^4$ is independently a monovalent hydrocarbon group having 1 to 10 carbon atoms, except that at least two of the $R^4$ in one molecule are an alkenyl group, and k is a number from 20 to 10,000).

Suitably, a straight-chain diorganopolysiloxane having one alkenyl group each at both ends of the molecular chain is preferred.

In the formula, each $R^4$ is independently a monovalent hydrocarbon group having 1 to 10 carbon atoms, such as methyl, ethyl, propyl, butyl, pentyl, hexyl, heptyl, or similar alkyl group; vinyl, allyl, butenyl, pentenyl, hexenyl, or similar alkenyl group; phenyl, tolyl, xylyl, or similar aryl group; benzyl, phenethyl, or similar aralkyl group; and chloromethyl, 3-chloropropyl, 3,3,3-trifluoropropyl, or similar alkyl halide group. Furthermore, at least two of the $R^4$ in one molecule are alkenyl groups, preferably vinyl groups. Each $R^4$ is also preferably a functional group preferably selected from an alkyl group having 1 to 10 carbon atoms such as a methyl group and an alkenyl group such as a vinyl group or a hexenyl group, and it is particularly preferable that of all $R^4$, at least two are alkenyl groups, and the remaining $R^4$ are methyl groups. It should be noted that from the viewpoint of the technical effect of the invention, it is preferable that $R^4$ is substantially free of an aryl group such as a phenyl group. If it contains a large amount of aryl groups such as phenyl groups, the coloration resistance of the cured product at high temperatures may deteriorate. Particularly suitable is having an alkenyl group such as a vinyl group at both molecular terminals, the rest of the $R^4$ being methyl groups.

In the formula, k is a number between 20 and 10,000, preferably between 30 and 9,000, and particularly preferably between 45 and 8,000. If k is at or above the lower limit of the aforementioned range, a granular composition having little stickiness at room temperature can be obtained. On the other hand, if k is below the upper limit of the aforementioned range, the composition as a whole can achieve favorable hot melt performance.

[Mixture Containing Non-Hot-Melt Organopolysiloxane Resin]

When the component (A1-2-1) or component (A1-2-2), which is the non-hot melt organopolysiloxane resin described above, is used as the component (a) of the present invention, the amount of the component (A2) used is within the range of 3~100 parts by mass, preferably in the range of 4~75 parts by mass, and particularly preferably in the range of 5~50 parts by mass, relative to 100 parts by mass of the sum of the component (A1-2-1) and the component (A1-2-2).

It is preferable to select a combination in which the molecular weights are different, such as component (A1-2-1, 2), which is an organopolysiloxane resin particle, and component (A2), which is a straight or branched chain organopolysiloxane. Note that in the combination of the high molecular weight MQ resin and the high molecular weight (long chain) vinyl polysiloxane disclosed in Patent Document 3, the melt viscosity of the mixture tends to be high. Therefore, if a composition with low melt viscosity is required, the amount of the inorganic filler described below must be reduced or not included at all. On the other hand, this combination is suitable for applications such as die attach films and the like, where a certain high melt viscosity is preferred.

Component (A) preferably exhibits hot-melt properties, specifically non-fluid at 25° C., and preferably has a melt viscosity of 8,000 Pas or less at 100° C. Non-fluid refers to not flowing in a no-load condition, for example, the state of being lower than the softening point measured by the softening point testing method in the ball and ring method of hot melt adhesives specified in "Testing methods for the softening point of hot melt adhesives" of JIS K 6863-1994. That is, in order to be non-fluid at 25° C., the softening point must be higher than 25° C.

Component (A) preferably has a melt viscosity at 100° C. of 8000 Pas or less, 5000 Pas or less, or within the range of 10 to 3000 Pas. Moreover, when the melt viscosity at 100° C. is within the abovementioned range, favorable adhesiveness after being hot melted and then cooled at 25° C. is obtained.

As long as component (A) is in the form of fine particles, the particle diameter is not limited, but the average primary particle diameter is preferably within the range of 1 to 5000 µm, within the range of 1 to 500 µm, within the range of 1 to 100 µm, within the range of 1 to 20 µm, or within the range of 1 to 10 µm. The average primary particle diameter can be obtained, for example, by observation with an optical microscope or an SEM. The shape of component (A) is not limited, and a spherical shape, a spindle shape, a plate shape, a needle shape, and an irregular shape are exemplified, and it is preferable to have a spherical shape or a true spherical shape because it melts uniformly. In particular, by making component (A) a spherical shape of 1 to 10 µm, the melting properties and the mechanical properties after curing of this compound can be favorably improved.

The method for producing component (A) is not limited, and a known method can be used. For example, component (A) is simply atomized, or at least two kinds of organopolysiloxanes are crosslinked and the reactants are atomized simultaneously or separately. In obtaining the microparticle component (A), some of the components (C) described below, such as, for example, a hydrosilylation reaction catalyst, may be atomized together with component (A), and is preferred.

As a method for atomizing the obtained organopolysiloxane after crosslinking at least two types of organopolysiloxanes, for example, a method of pulverizing the organopolysiloxane using a pulverizer or a method of directly pulverizing the silicone in the presence of a solvent can be cited. The pulverizer may be, for example, but not limited to a roll mill, a ball mill, a jet mill, a turbo mill, or a planetary mill. As a method of directly atomizing the silicone in the presence of a solvent, for example, spraying by a spray dryer, or atomization by a biaxial kneader or a belt dryer can be cited. In the present invention, the use of spherical hot-meltable organopolysiloxane resin microparticles obtained by spraying with a spray dryer is particularly preferable from the viewpoints of the melting characteristics of the granular compound, the flexibility of the cured product, the compounded amount of component (B), efficiency during manufacture, and the workability of the composition.

When the component (A1-2-1,2) is used as organopolysiloxane resin fine particles, the component (A2) can be mixed with component (A1-2-1,2) when making the fine particles to form a mixture of fine particles. Component (A2) may be mixed with component (A1-2-1,2) to form fine particles, or it may be added later together with components (B) and (C).

Component (A) having a spherical shape and an average primary particle size of 1 to 500 µm can be manufactured by the use of a spray dryer or the like. The heating and drying temperature of the spray dryer needs to be appropriately set based on the heat resistance of the organopolysiloxane resin particulates and the like. In order to prevent secondary aggregation of the organopolysiloxane resin microparticles, the temperature of the organopolysiloxane resin microparticles is preferably controlled below the glass transition temperature thereof. The organopolysiloxane resin fine particles thus obtained can be recovered by a cyclone, a bag filter, or the like.

In order to obtain a uniform component (A), a solvent may be used in the above-mentioned step within the range that does not inhibit the curing reaction. Examples of the solvents include, but are not limited to, aliphatic hydrocarbons such as n-hexane, cyclohexane, and n-heptane; aromatic hydrocarbons such as toluene, xylene, and mesitylene; ethers such as tetrahydrofuran and dipropyl ether; silicones such as hexamethyldisiloxane, octamethyltrisiloxane, and decamethyltetrasiloxane; esters such as ethyl acetate, butyl acetate, and propylene glycol monomethyl ether; and ketones such as acetone, methyl ethyl ketone, and methyl isobutyl ketone.

[Removal of Volatile Low Molecular Weight Components]

As described above, when an organopolysiloxane resin having a high content of a specific branched siloxane unit ($SiO_{4/2}$) is used as the organopolysiloxane resin containing component (A) (specifically, component (A1-2-1,2) and the like), volatile low molecular weight components are generated in the production step, volatile low molecular weight components are generated and tend to be mixed into the resin, and these volatile components have an effect of greatly reducing the hardness of a cured product obtained from the composition defined in the present invention. Furthermore, if the cured product containing a large amount of volatile low molecular weight components is exposed to a temperature exceeding 150° C. over a long period of time, the low molecular weight components will volatilize, resulting in a significant increase in the hardness of the cured product. Furthermore, when the network of the silicone cured product contains a large amount of siloxane units as expressed by $SiO_{4/2}$, the cured product tends to be extremely brittle in terms of hardness, and consequently, embrittlement also occurs.

Therefore, the low molecular weight component is preferably removed from these organopolysiloxane resin components as much as possible. Specifically, the rate of mass loss of these organopolysiloxane resin components when exposed to 200° C. for 1 hour must be 2.0 mass % or less, preferably 1.5 mass % or less, and more preferably 1.0 mass % or less.

The type of the volatile low molecular weight component is not particularly limited, but since the organopolysiloxane resin of the present invention contains a large number of branched siloxane units (Q units) as expressed by $SiO_{4/2}$, the volatile siloxane component as expressed by $M_4Q$ is easily generated as a byproduct by a reaction with the siloxane units (M units) as expressed by $R_3SiO_{1/2}$. In the present invention, it is particularly preferable that the aforementioned mass reduction rate is achieved by removing the volatile low molecular weight component having the volatile siloxane component as a main component from the organopolysiloxane resin.

The component (A) are organopolysiloxane resin fine particles, and by treating the organopolysiloxane resin, which is a raw material for the fine particles, or the obtained organopolysiloxane resin fine particles at a temperature of 200° C. or higher, it is possible to simultaneously remove the low molecular weight component contained in the organopolysiloxane resin.

[Component (B)]

Component (B) of the present invention is a functional inorganic filler, and although particles of an arbitrary size may be used, if gap-filling property is to be improved, an inorganic filler essentially free of coarse particles having an average particle diameter of 10.0 μm or more is suitable. When such an inorganic filler that does not contain coarse particles is used together with the aforementioned component (A), it is possible to provide a curable particulate silicone composition that, in particular, has excellent gap-filling properties when melted and cured to provide a flexible cured product at room to high temperatures. The term "substantially free of coarse particles having an average particle diameter of 10.0 μm or more or 5.0 μm or more" means that no coarse particles having an average particle diameter of the long diameter of the particle being 10.0 μm or more or 5.0 μm or more are observed when component (B) is observed using an electron microscope or the like, or that the volume ratio of coarse particles having an average particle diameter of 10.0 μm or more or 5.0 μm or more is less than 1% when the particle diameter distribution of component (B) is measured using a measurement using a laser diffraction/scattering type particle size distribution or the like.

On the other hand, inorganic fillers having an average particle diameter of 10.0 μm or more may be included if a filling amount that is a high volume % is required, such as providing thermal conductivity, reducing the coefficient of linear expansion, or the like. The use of inorganic fillers with relatively large particle size enables high filling of inorganic fillers without causing significant thickening.

Such component (B) is preferably at least one filler which does not have a softening point or does not have a softening point below 50° C., and may be a component which improves the handling workability of the composition and imparts mechanical properties and other properties to the cured product of the composition. Examples of component (B) include inorganic fillers, organic fillers, and mixtures thereof, and inorganic fillers are preferable. Examples of this inorganic filler include reinforcing fillers, white pigments, thermally conductive fillers, electrically conductive fillers, phosphors, and mixtures of at least two types thereof, and the composition preferably contains a reinforcing filler that does not substantially contain coarse particles having an average particle diameter of 5 μm or more. Examples of the organic filler include a silicone resin filler, a fluorine resin filler, and a polybutadiene resin filler. The shape of these fillers is not particularly limited, and may be spherical, spindle-shaped, flat, needle-shaped, amorphous, or the like.

When the present composition is used for applications such as sealants, protective agents, adhesives, light reflecting materials, etc., since it imparts mechanical strength to the cured product and improves the protective property or adhesiveness, it is preferable to incorporate a reinforcing filler as component (B). Examples of the reinforcing filler include fumed silica, precipitated silica, fused silica, calcined silica, fumed titanium dioxide, quartz, calcium carbonate, diatomaceous earth, aluminum oxide, aluminum hydroxide, zinc oxide, and zinc carbonate. These reinforcing fillers may also be surface treated with organoalkoxysilanes such as methyltrimethoxysilane; organohalosilanes such as trimethylchlorosilane; organosilazanes such as hexamethyldisilazane; and siloxane oligomers such as α,ω-silanol group-blocked dimethylsiloxane oligomers, α,ω-silanol group-blocked methylphenylsiloxane oligomers, α,ω-silanol group-blocked methylvinylsiloxane oligomers, and the like. Further, as the reinforcing filler, a fibrous filler such as calcium metasilicate, potassium titanate, magnesium sulfate, sepiolite, zonolite, aluminum borate, rock wool, glass fiber, or the like may be used.

The curable granular silicone composition of the present invention can be used as a light reflective material, especially for optical semiconductor (LED) applications, and a white pigment may be used as component (B) since it imparts whiteness to the cured product and improves the light reflectivity. Examples of the white pigment include metal oxides such as titanium oxide, aluminum oxide, zinc oxide, zirconium oxide, magnesium oxide, and the like;

hollow fillers such as glass balloons, glass beads, and the like; and otherwise barium sulfate, zinc sulfate, barium titanate, aluminum nitride, boron nitride, and antimony oxide. Titanium oxide has high optical reflectivity and concealing properties, and is therefore preferable. Furthermore, aluminum oxide, zinc oxide, and barium titanate have high optical reflectivity of a UV region, and are therefore preferable. Furthermore, a surface of the white pigment can be treated by a silane coupling agent, silica, aluminum oxide, and the like. Particularly suitable white pigments are titanium oxide microparticles having an average particle diameter of 0.5 μm or less, and by filling the composition to a high level, the cured product is granted with high light reflectance and concealing properties in the visible wavelength region, and furthermore, the light reflectance in the visible wavelength region does not readily change when comparing between low and high wavelengths.

Component (B) may contain silicone fine particles which do not correspond to component (A), and the stress relaxation characteristics and the like can be improved or adjusted as desired. Silicone fine particles include non-reactive silicone resin fine particles and silicone elastomer fine particles, but silicone elastomer fine particles are suitably exemplified from the standpoint of improving flexibility or stress relaxation properties.

The silicone elastomer fine particles are a crosslinked product of linear diorganopolysiloxane comprised of primarily of diorganosiloxy units (D-units). The silicone elastomer fine particles can be prepared by a crosslinking reaction of diorganopolysiloxane by a hydrosilylation reaction, a condensation reaction of a silanol group, or the like, and in particular, the silicone elastomer fine particles can be suitably obtained by a crosslinking reaction of organohydrogenpolysiloxane having a silicon bonded hydrogen atom at a side chain or a terminal with diorganopolysiloxane having an unsaturated hydrocarbon group such as an alkenyl group at a side chain or a terminal under a hydrosilylation reaction catalyst. The silicone elastomer fine particles may have various shapes such as spherical, flat, and irregular shapes, but are preferably spherical in terms of dispersibility, and among these, true spherical is more preferable. Commercial products of such silicone elastomer fine particles include, for example, "Torefil-E series" and "EP Powder series" manufactured by Dow Corning Toray Company, Ltd., and "KMP series" manufactured by Shin-Etsu Chemical Co., Ltd.

The silicone elastomer fine particles may be subjected to a surface treatment. Examples of the surface treatment agent include, for example, methylhydrogenpolysiloxane, silicone resin, metal soap, silane coupling agent, inorganic oxide such as silica and titanium oxide, fluorine compound such as perfluoroalkylsilane and perfluoroalkylphosphate ester salt.

When the present composition is used as a wavelength conversion material for an LED, a phosphor may be blended as component (B) to convert the emission wavelength from the optical semiconductor element. There is no particular limitation on this phosphor so long as coarse particles with an average particle diameter of 5 μm or more is essentially not included, and examples of the phosphor include yellow, red, green, and blue light phosphors, which include oxide phosphors, oxynitride phosphors, nitride phosphors, sulfide phosphors, oxysulfide phosphors, and the like, which are widely used in light emitting diodes (LED). Examples of the oxide phosphors include yttrium, aluminum, and garnet-type YAG green to yellow light phosphors containing cerium ions; terbium, aluminum, and garnet-type TAG yellow light phosphors containing cerium ions; and silicate green to yellow light phosphors containing cerium or europium ions. In addition, exemplary oxynitride phosphors include silicon, aluminum, oxygen, and nitrogen type SiAlON red to green light phosphors containing europium ions. Exemplary nitride phosphors include calcium, strontium, aluminum, silicon, and nitrogen type CASN red light phosphors containing europium ions. Exemplary sulfide phosphors include ZnS green light phosphors containing copper ions or aluminum ions. Exemplary oxysulfide phosphors include $Y_2O_2S$ red light phosphors containing europium ions. In the composition, two or more of these phosphors may be used in combination.

In addition, the composition may contain a thermally conductive filler or a conductive filler to impart thermal or electrical conductivity to the cured product. As the thermally conductive filler or the conductive filler, there are exemplified a metal fine powder such as gold, silver, nickel, copper, aluminum; a fine powder obtained by depositing or plating a metal such as gold, silver, nickel, copper or the like on the surface of a fine powder such as ceramic, glass, quartz, organic resin or the like; a metal compound such as aluminum oxide, magnesium oxide, aluminum nitride, boron nitride, zinc oxide or the like; and graphite; and a mixture of two or more of these. When electrical insulation is required for the present composition, a metal oxide-based powder or a metal nitride-based powder is preferable, and in particular, an aluminum oxide powder, a zinc oxide powder, or an aluminum nitride powder is preferable.

Although the content of component (B) is not limited, it is preferably in the range of 10 to 70 vol % of the entire composition, and particularly suitably in the range of 10 to 50 vol %. If the content of component (B) exceeds the above-described upper limit, the resulting cured product tends to become hard, the workability of the composition and the gap-filling property during hot-melting decrease, the flexibility and mechanical strength of the obtained cured product under room temperature to high temperature become insufficient, and the stress relief properties of the cured product may become insufficient.

[Component (C)]

Component (C) is a curing agent for curing component (A), and is not limited as long as component (A) can be cured. When component (A) has an alkenyl group, component (C) is an organohydrogenpolysiloxane having at least two silicon atom bonded hydrogen atoms in one molecule and a hydrosilylation reaction catalyst, when component (A) contains an alkenyl group and contains a hydrosilylation reaction catalyst, component (C) may be only an organopolysiloxane having at least two silicon atom bonded hydrogen atoms in one molecule, but a hydrosilylation reaction catalyst may be used in combination. In addition, when component (A) has an alkenyl group, component (C) may be an organic peroxide, but an organopolysiloxane having at least two silicon atom bonded hydrogen atoms may be used in combination in one molecule. On the other hand, when component (A) has a silicon atom bonded hydrogen atom, component (C) is an organopolysiloxane having at least two alkenyl groups in one molecule and a hydrosilylation reaction catalyst, when component (A) has a silicon atom bonded hydrogen atom and contains a hydrosilylation reaction catalyst, component (C) may be an organopolysiloxane having at least two alkenyl groups in one molecule, but a hydrosilylation reaction catalyst may be used in combination.

Examples of organopolysiloxanes in component (C) include organopolysiloxanes containing alkenyl groups represented by the above ($a_1$) and/or the above ($a_2$), or organopolysiloxanes containing silicon atom bonded hydrogen atoms represented by the above ($a_3$) and/or the above ($a_4$).

When an organopolysiloxane is used as component (C), the content thereof is not limited, but for curing the composition, it is preferable that the amount of silicon atom bonded hydrogen atoms is within the range of 0.5 to 20 mol or within the range of 1.0 to 10 mol with regard to 1 mol of alkenyl group in the composition.

As the hydrosilylation reaction catalyst, platinum-based catalysts, rhodium-based catalysts, and palladium-based catalysts are exemplified, with platinum-based catalysts being preferable because the curing of the present composition can be remarkably accelerated. Exemplary platinum-based catalysts include platinum fine powder, chloroplatinic acid, an alcohol solution of chloroplatinic acid, a platinum-alkenyl siloxane complex, a platinum-olefin complex, a platinum-carbonyl complex, and a catalyst in which these platinum-based catalysts are dispersed or encapsulated with a thermoplastic resin such as silicone resin, polycarbonate resin, acrylic resin or the like, with a platinum-alkenyl siloxane complex particularly preferable. Exemplary alkenylsiloxanes include: 1,3-divinyl-1,1,3,3-tetramethyldisiloxane; 1,3,5,7-tetramethyl-1,3,5,7-tetravinylcyclotetrasiloxane; alkenyl siloxanes obtained by substituting a portion of methyl groups of the alkenylsiloxanes with an ethyl group, a phenyl group, or the like; and alkenylsiloxanes obtained by substituting a portion of vinyl groups of these alkenylsiloxanes with an allyl group, a hexenyl group, or the like. In particular, 1,3-divinyl-1,1,3,3-tetramethyldisiloxane is preferable because the platinum-alkenyl siloxane complex has good stability. In addition, in terms of improving the handleability as well as the pot life of the composition, a platinum containing hydrosilylation reaction catalyst in fine particles dispersed and encapsulated with thermoplastic resin may be used. As the catalyst for promoting the hydrosilylation reaction, a non-platinum based metal catalyst such as iron, ruthenium, iron/cobalt, or the like may be used.

Note that a certain degree of the temperature is applied to the composition during the mixing step, albeit for a short period of time, in the manufacturing method of the present invention, and therefore, a hydrosilylation reaction catalyst containing platinum in the form of fine particles dispersed or encapsulated in a thermoplastic resin may be used and is preferred from the perspective of storage stability of the composition.

The amount of the hydrosilylation reaction catalyst to be added is preferably an amount in which the metal atom is within the range of 0.01 to 500 ppm, an amount within the range of 0.01 to 100 ppm, or an amount within the range of 0.01 to 50 ppm in terms of mass units with regard to component (A).

Examples of organic peroxides include alkyl peroxides, diacyl peroxides, ester peroxides, and carbonate peroxides.

Examples of alkyl peroxides include dicumyl peroxide, di-tert-butyl peroxide, di-tert-butylcumyl peroxide, 2,5-dimethyl-2,5-di(tert-butylperoxy)hexane, 2,5-dimethyl-2,5-di(tert-butylperoxy)hexyne-3, tert-butylcumyl, 1,3-bis(tert-butylperoxyisopropyl)benzene, and 3,6,9-triethyl-3,6,9-trimethyl-1,4,7-triperoxonan.

Examples of diacyl peroxides include benzoyl peroxide, lauroyl peroxide, and decanoyl peroxide.

Examples of ester peroxides include 1,1,3,3-tetramethylbutylperoxyneodecanoate, α-cumylperoxyneodecanoate, tert-butylperoxyneodecanoate, tert-butylperoxyneoheptanoate, tert-butylperoxypivalate, tert-hexylperoxypivalate, 1,1,3,3-tetramethylbutylperoxy-2-ethylhexanoate, tert-amylperoxyl-2-ethylhexanoate, tert-butylperoxy-2-ethylhexanoate, tert-butylperoxyisobutyrate, di-tert-butylperoxyhexahydroterephthalate, tert-amylperoxy-3,5,5-trimethylhexanoate, tert-butylperoxy-3,5,5-trimethylhexanoate, tert-butylperoxyacetate, tert-butylperoxybenzoate, and di-butylperoxytrimethyladipate.

Examples of carbonate peroxides include di-3-methoxybutyl peroxydicarbonate, di(2-ethylhexyl)peroxydicarbonate, diisopropyl peroxycarbonate, tert-butyl peroxyisopropylcarbonate, di(4-tert-butylcyclohexyl)peroxydicarbonate, dicetyl peroxydicarbonate, and dimyristyl peroxydicarbonate.

This organic peroxide preferably has a 10-hour half-life temperature of not lower than 90° C. or not lower than 95° C. Examples of such organic peroxide include dicumyl peroxide, di-tert-butyl peroxide, di-tert-hexyl peroxide, tert-butylcumyl peroxide, 2,5-dimethyl-2,5-di(tert-butylperoxy)hexane, 1,3-bis(tert-butylperoxyisopropyl)benzene, di-(2-tert-butylperoxyisopropyl)benzene, and 3,6,9-triethyl-3,6,9-trimethyl-1,4,7-triperoxonan.

While not limited thereto, the content of organic peroxide is preferably within the range of 0.05 to 10 parts by mass, or within the range of 0.10 to 5.0 parts by mass, with regard to 100 parts by mass of component (A).

The present composition may also contain hot-melt microparticles, curing retardants and adhesion-granting agents other than component (A) as other optional components, as long as the purpose of the present invention is not impaired.

One or more types selected from various hot-melt synthetic resins, waxes, fatty acid metal salts, and the like can be used as hot-melt microparticles other than component (A). The wax component exhibits low kinematic viscosity at high temperatures (150° C.) and forms a melt with excellent flowability. In addition, by combining the components (A) to (C) described above, the wax component in the melt that makes up the present composition spreads quickly throughout the composition at high temperature, thereby lowering the viscosity of the substrate surface to which the molten composition is applied and of the composition as a whole, rapidly lowering the surface friction of the substrate and the molten composition, and significantly increasing the fluidity of the composition as a whole. Therefore, the viscosity and flowability of the molten composition can be greatly improved by adding only a very small amount to the total amount of other components.

The wax component may be a petroleum wax such as paraffin as long as it satisfies the conditions of drip point and kinematic viscosity at the time of melting described above, but from the viewpoint of the technical effect of the present invention, a hot melt component that makes up a fatty acid metal salt is preferable, and a metal salt of a higher fatty acid such as stearic acid, palmitic acid, oleic acid and isononanoic acid is particularly preferable. Here, the types of the fatty acid metal salts described above are also not particularly limited, and suitable examples include alkali metal salts such as lithium, sodium, potassium, and the like; alkaline earth metal salts such as magnesium, calcium, barium, and the like; or zinc salts.

Particularly suitable as the wax component are fatty acid metal salts having a free fatty acid content of 5.0% or less, 4.0% or less, and more preferably fatty acid metal salts with 0.05 to 3.5% of free fatty acid content. Examples of such a component include at least one or more stearic acid metal salts. From the viewpoint of the technical effect of the present invention, the present component preferably consists substantially only of one or more stearic acid metal salts, a hot-melt component with a melting point of 150° C. or less selected from calcium stearate (melting point 150° C.), zinc stearate (melting point 120° C.), and magnesium stearate (melting point 130° C.).

Regarding the amount of the wax component used, with the entire composition taken as 100 mass parts, the content of the component is in the range of 0.01 to 5.0 parts by mass, and may be 0.01 to 3.5 parts by mass or 0.01 to 3.0 parts by mass. If the amount of the wax component used exceeds the upper limit, the adhesiveness and mechanical strength of the cured product obtained from the granular cured silicone composition of the present invention may be insufficient. If the amount used is less than the lower limit, sufficient fluidity while heating and melting may not be achieved.

Examples of the curing retardant include: alkyne alcohols such as 2-methyl-3-butyne-2-ol, 3,5-dimethyl-1-hexyne-3-ol, 2-phenyl-3-butyne-2-ol, and 1-ethynyl-1-cychlohexanol; enyne compounds such as 3-methyl-3-pentene-1-yne, and 3,5-dimethyl-3-hexene-1-yne; alkenyl group-containing low molecular weight siloxanes such as tetramethyltetravinylcyclotetrasiloxane and tetramethyltetrahexenylcyclotetrasiloxane; and alkynyloxysilanes such as methyl tris(1,1-dimethyl propynyloxy)silane and vinyl tris(1,1-dimethyl propynyloxy)silane. The content of the curing retardant is not limited, but is preferably within the range of 10 to 10000 ppm in terms of mass units, with regard to the composition.

As the adhesion imparting agent, an organosilicon compound having at least one alkoxy group bonded to a silicon atom in one molecule is preferable. Examples of this alkoxy group include a methoxy group, an ethoxy group, a propoxy group, a butoxy group, and a methoxyethoxy group, with a methoxy group particularly preferable. Moreover, examples of groups other than alkoxy group, bonded to the silicon atom of the organosilicon compound include: halogen substituted or unsubstituted monovalent hydrocarbon groups such as an alkyl group, an alkenyl group, an aryl group, an aralkyl group, and a halogenated alkyl group; glycidoxyalkyl groups such as a 3-glycidoxypropyl group and a 4-glycidoxybutyl group; epoxycyclohexylalkyl groups such as a 2-(3,4-epoxycyclohexyl)ethyl group and a 3-(3,4-epoxycyclohexyl)propyl group; epoxyalkyl groups such as a 3,4-epoxybutyl group and a 7,8-epoxyoctyl group; acryl group-containing monovalent organic groups such as a 3-methacryloxypropyl group; and hydrogen atoms. This organosilicon compound preferably has a group that may react with an alkenyl group or a silicon atom-bonded hydrogen atom in this composition, and specifically, preferably has a silicon atom-bonded hydrogen atom or an alkenyl group. Moreover, because favorable adhesion can be imparted to various substrates, this organosilicon compound preferably has at least one epoxy group-containing monovalent organic group per one molecule. Examples of such an organosilicon compound include an organosilane compound, an organosiloxane oligomer, and an alkyl silicate. Exemplary molecular structures of this organosiloxane oligomer or alkyl silicate include a linear structure, a partially branched linear structure, a branched structure, a cyclic structure, and a network structure, among which a linear structure, a branched structure, and a network structure are particularly preferable. Examples of the organic silicon compound include silane compounds such as 3-glycidoxypropyltrimethoxysilane, 2-(3,4-epoxycyclohexyl) ethyltrimethoxysilane, and 3-methacryloxypropyltrimethoxysilane; siloxane compounds with at least one of each of a silicon-bonded alkenyl group or a silicon-bonded hydrogen atom and a silicon-bonded alkoxy group in one molecule; a silane compound or siloxane compound having at least one silicon-bonded alkoxy group; a mixture of siloxane compounds having at least one each of silicon-bonded alkenyl group and silicon-bonded alkenyl group in one molecule, a reaction mixture of an amino group-containing organoalkoxysilane and an epoxy group-containing organoalkoxysilane, and an organic compound having at least two alkoxysilyl groups containing bonds other than silicon-oxygen bonds between their silyl groups in one molecule; general formula:

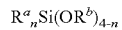

(wherein, $R^a$ represents an organic group containing a monovalent epoxy group, $R^b$ represents an alkyl group having a carbon number of 1 to 6, or a hydrogen atom. n represents a number within a range of 1 to 3), representing epoxy group-containing silane or a partially hydrolyzed condensate, reaction mixture of vinyl group-containing siloxane oligomer (including chain or ring shaped structure) and epoxy group-containing trialkoxysilane, methyl polysilicate, ethyl polysilicate, and epoxy group-containing ethyl polysilicate.

The adhesion imparting agent is preferably in the form of a low viscosity liquid, and the viscosity thereof is not limited, but is preferably within the range of 1 to 500 mPa·s at 25° C. In addition, while not limited thereto, the content of this adhesion imparting agent is preferably within the range of 0.01 to 10 parts by mass with regard to 100 parts by mass of the total of the present composition.

In the present invention, a reaction mixture of an organoalkoxysilane containing an amino group and an organoalkoxysilane containing an epoxy group is exemplified as a particularly suitable adhesive imparting agent. Such a component is a component for improving initial adhesiveness to various base materials it contacts during curing, in addition to improving adhesiveness at low temperatures particularly to an unwashed adherend. Moreover, some curing systems of a curable silicone composition obtained by blending this adhesion promoter may act as a crosslinking agent. Such a reaction mixture is disclosed in JP 52-8854 B and JP 10-195085 A.

Exemplary alkoxysilanes having an amino group-containing organic group forming such component include an aminomethyltriethoxysilane, 3-aminopropyltrimethoxysilane, 3-aminopropyltriethoxysilane, 3-aminopropylmethyldimethoxysilane, N-(2-aminoethyl)aminomethyltributoxysilane, N-(2-aminoethyl)-3-aminopropyltrimethoxysilane, N-(2-aminoethyl)-3-aminopropylmethyldimethoxysilane, and 3-anilinopropyltriethoxysilane.

Moreover, exemplary epoxy groups containing organoalkoxysilanes may include 3-glycidoxyprolyltrimethoxysilane, 3-glycidoxypropylmethyldimethoxysilane, 2-(3,4-epoxycyclohexyl)ethyltrimethoxysilane, and 2-(3,4-epoxy cyclohexyl)ethylmethyldimethoxysilane.

The ratio of the alkoxysilane having an amino group containing organic group to the alkoxysilane having an epoxy group containing organic group is, in terms of the molar ratio, preferably within the range of (1:1.5) to (1:5), particularly preferably within the range of (1:2) to (1:4). This component (e1) can be easily synthesized by mixing alkoxysilane having an amino group containing organic group and alkoxysilane having an epoxy group containing organic group as mentioned above to cause them to react at room temperature or under heating.

In particular, when an alkoxysilane having an amino group containing organic group is reacted with an alkoxysilane having an epoxy group containing organic group by the method described in JP 10-195085 A, the present invention particularly preferably contains a carbasilatrane derivative obtained by cyclizing by an alcohol exchange reaction and expressed by the general formula:

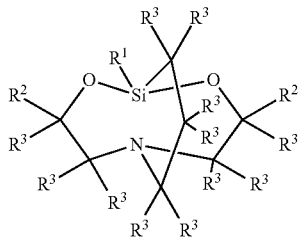
[Formula 1]

{where $R^1$ is an alkyl group, alkenyl group, or an alkoxy group, and $R^2$ is the same or different group selected from the group consisting of groups expressed by the general formula:

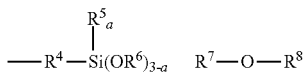
[Formula 2]

(where $R^4$ is an alkylene group or alkyleneoxyalkylene group, $R^5$ is a monovalent hydrocarbon group, $R^6$ is an alkyl group, $R^7$ is an alkylene group, Fe is an alkyl group, alkenyl group, or acyl group, and a is 0, 1, or 2.) $R^3$ is the same or different hydrogen atom or alkyl group.} Exemplary carbasilatrane derivatives may include carbasilatrane derivatives having a silicon atom-bonded alkoxy group or a silicon atom-bonded alkenyl group per one molecule represented by the following structure.

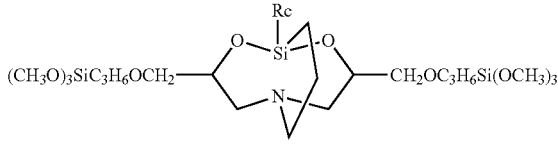
[Formula 3]

(where Rc is a group selected from methoxy groups, ethoxy groups, vinyl groups, allyl groups and hexenyl groups)

Furthermore, in the present invention, a silatran derivative as expressed by the following structural formula may be utilized as an adhesion-imparting agent.

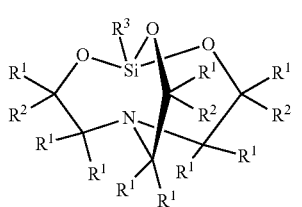
[Formula 4]

$R^1$ in the formula is the same or a different hydrogen atom or an alkyl group, and $R^1$ is particularly preferably a hydrogen atom or a methyl group. Furthermore, R2 in the aforementioned formula is the same or different group selected from a group consisting of a hydrogen atom, alkyl groups, and organic group containing an alkoxysilyl group as expressed by the general formula:

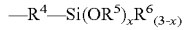

where at least one of the $R^2$s is the organic group containing an alkoxysilyl group. Examples of the alkyl group of $R^2$ include methyl groups and the like. Furthermore, in the organic group containing an alkoxysilyl group of $R^2$, $R^4$ in the formula is a divalent organic group, and examples include alkylene groups or alkyleneoxyalkylene groups. An ethylene group, a propylene group, a butylene group, a methyleneoxypropylene group, and a methyleneoxypentylene group are particularly preferable. Furthermore, $R^5$ in the formula is an alkyl group having 1 to 10 carbon atoms, and preferably a methyl group or an ethyl group. Furthermore, $R^6$ in the formula is a substituted or unsubstituted monovalent hydrocarbon group, and preferably a methyl group. Furthermore, x in the formula is 1, 2, or 3, and preferably 3.

Examples of such an organic group containing an alkoxysilyl group of R2 include the following groups.

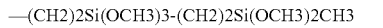

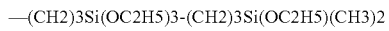

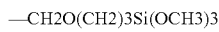

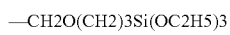

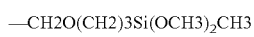

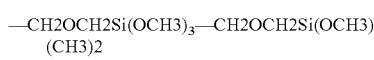

$R^3$ in the above formula is at least one group selected from a group consisting of substituted or unsubstituted monovalent hydrocarbon groups, alkoxy groups having 1 to 10 carbon atoms, glycidoxyalkyl groups, oxiranylalkyl groups, and acyloxyalkyl groups. Examples of the monovalent hydrocarbon group of $R^3$ include methyl groups and other alkyl groups. Examples of the alkoxy group of $R^3$ include methoxy groups, ethoxy groups, and propoxy groups. Examples of the glycidoxyalkyl group of $R^3$ include 3-glycidoxypropyl groups. Examples of the oxiranylalkyl group of $R^3$ include 4-oxiranylbutyl groups and 8-oxiranyl octyl groups. Examples of the acyloxyalkyl group of $R^3$ include acetoxypropyl groups and 3-methacryloxypropyl groups. In particular, $R^3$ is preferably an alkyl group, an alkenyl group, or an alkoxy group, and more preferably an alkyl group or an alkenyl group. Particularly preferred examples include groups selected from methyl groups, vinyl groups, allyl groups, and hexenyl groups.

Furthermore, the composition may contain, as other optional components, heat resistance agents such as iron oxide (red iron oxide), cerium oxide, cerium dimethyl silanolate, fatty acid cerium salt, cerium hydroxide, zirconium compound, and the like; and dyes, pigments other than white, flame retardant agents, and the like may be contained as long as the purpose of the present invention is not impaired.

The aforementioned composition has gap-filling properties when melted (hot melted), with functionalities of improved light reflectance and thermal conductivity by combining inorganic fillers such as white pigments, thermally conductive fillers, electrically conductive fillers, phosphors, and the like, with organopolysiloxane resin fine particles, which are component (A), or a mixture containing the same. A cured product is flexible from room temperature to high temperature, specifically, from 25° C. to 150° C., has excellent stress relaxation properties, and is not easily damaged even when deformed by bending or the like at room temperature.

[Storage Elastic Modulus of the Cured Product]

Specifically, the cured product resulting from curing the composition described above has a storage modulus (G') value at 25° C. of 2,000 MPa or less, and a storage modulus (G') value at 150° C. of 100 MPa or less. The cured product is flexible at both room temperature (25° C.) and high temperature (150° C.), has excellent adhesion and followability to substrates such as semiconductor substrates, and can be used for encapsulating semiconductor devices that are subject to deformation, such as flexible semiconductor substrates that have been introduced in recent years, suppressing damage to the encapsulated semiconductor device or generation of defects such as delamination and voids. For applications requiring particularly high elongation and deformation tracking, the value of the storage modulus (G') at 25° C. may be 1,500 MPa or less, or 1,000 MPa or less, and the value of the storage modulus (G') at 150° C. may be 50 MPa or less or 40 MPa or less.

[Peak Value and Peak Temperature of Loss Tangent (Tan δ) of Cured Product]

Further, the cured product comprising the cured composition of the present invention must have a peak loss tangent (tan δ) defined by the ratio of the storage modulus (G') to the loss modulus (G") at a frequency of 1.0 Hz, or in other words, G'/G", the peak value of the loss tangent (tan δ) defined by the loss tangent (tan δ) must be 0.40 or more, preferably 0.50 or more, and particularly preferably in the range of 0.50 to 0.80. If the peak value of the tan δ is less than 0.40, warping or breaking of the molded product may occur, especially in thin film form or when it is integrally molded with an aluminum lead frame or the like. The peak temperature giving the peak value of tan δ is not particularly limited, but it is preferable that the peak temperature is in the range of 30 to 200° C., and the peak temperature is in particular preferably in the range of 40 to 150° C.

In the composition of the present invention, a cured product having excellent stress relief capability is formed by setting the peak value of tan δ above 0.4 or more, and in particular, by suitably selecting the components described above, a high tan δ can be realized even in a composition having a relatively high content of inorganic filler. Such cured products achieve superior low warpage capability in the large-area batch encapsulation process for semiconductors, which has been introduced in recent years.

Furthermore, in the composition of the present invention, the mixture of the organopolysiloxane resin fine particles having hot melt properties, curing agent, and functional filler in step 1 particularly preferably provides, by curing, a cured product, where the (1) maximum torque measured from a molding temperature of room temperature through 200° C. using an MDR (Moving Die Rheometer) is less than 50 dN·m and the (2) loss tangent (tan δ) as expressed by the ratio of stored torque value/lost torque value is less than 0.2.

In particular, (1) the maximum torque value measured by the MDR set at 150° C., which is a general molding temperature, is in particular preferably less than 50 dN·m, and (2) when the maximum torque value is reached, the value of the loss tangent (tan δ) expressed as the ratio of the stored torque value/lost torque value is particularly preferably less than 0.2. Note, it goes without saying that as long as the curing behavior described above is satisfied and the physical properties of the MDR at a specific temperature (for example, 150° C.) are satisfied, the cured silicone composition for transfer molding of the present invention can be selected and used for any desired molding temperature from room temperature to 200° C. (for example, a molding temperature other than 150° C.).

The maximum torque values and described above are explained below. In the present invention, the torque value is the torque value obtained by measurement of the cured product consisting of the cured composition by MDR in accordance with JIS K 6300-2 "Physical properties of unvulcanized rubber—Part 2: Determination of vulcanization characteristics by vibratory vulcanization tester." The maximum torque value is the maximum torque value measured during 600 seconds after vulcanization at the molding temperature, preferably 150° C. Here, the maximum torque value of the cured product at the molding temperature of the cured product being less than 50 dN·m means that the cured product after molding is soft even at a high temperature, that is, the cured product has a low modulus and is flexible, a low elastic modulus, and superior stress relaxation properties. In the present invention, the maximum torque value of the cured product at the molding temperature may be less than 40 dN·m, preferably less than 35 dN·m, and particularly preferably in the range of 5 to 30 dN·m. In this range, both sufficient stress relaxation properties of the cured product can be achieved and the loss tangent (tan δ) described below can be achieved. On the other hand, if the maximum torque value at the molding temperature of the cured product exceeds the upper limit described above, the cured product is excessively hard and stress relaxation properties cannot be achieved, and this may cause warpage or defects in the molded material, especially when integrally molded with the base material.

Next, the conditions for the loss tangent (tan δ) of the composition in the present invention will be described. The loss tangent (tan δ) is measured through measurement using MDR as described above by reading the value of the loss tangent (tan δ), which is expressed as the ratio of the stored torque value/lost torque value, when the maximum torque value is reached. Here, the loss tangent (tan δ) of the composition being less than 0.2 means that the rubber elasticity of the cured product resulting from curing the composition is low and the surface thereof is moderately hard, and the cured product does not readily adhere to/attach onto the metal mold when being released from the mold in the molding process and has superior demoldability. From the viewpoint of demoldability, the loss tangent (tan δ) of the cured product is preferably in the range of 0.01 to 0.19 when the maximum torque value is reached, and the loss tangent is particularly preferably in the range of 0.03 to 0.18. On the other hand, if the loss tangent (tan δ) of the composition exceeds 0.2, the rubber elasticity of the obtained cured product becomes high and the surface thereof becomes sticky, so the cured product tends to adhere to/attach to the metal mold when being released from the mold, and smooth separation from the metal mold does not readily occur, and demoldability may become insufficient.

In the cured product, by satisfying both (1) the condition of the maximum torque value and (2) the condition of the loss tangent (tan δ) value expressed as the ratio of the stored torque value/lost torque value when the maximum torque value is reached, the curable silicone sheet has superior stress relaxation properties of a cured product thereof and is resistant to warpage and defects in the cured product, and achieves favorable demolding properties.

EXAMPLES

The method of manufacturing a hot-melt curable silicone sheet of the present invention are described in detail by means of examples and comparative examples. Note that in the formulas, Me, Ph, and Vi represent a methyl group, a phenyl group, and a vinyl group, respectively. The softening points of a curable particulate silicone compositions containing the curable silicone sheet was measured by the following method.

[Softening Point of Curable Particulate Silicone Composition]

The curable particulate silicone composition was molded into cylindrical pellets of φ14 mm*22 mm. The pellet was placed on a hot plate set at 25° C. to 100° C. and kept pressed from above for 10 seconds with a load of 100 grams, and after the load was removed, the amount of deformation of the pellet was measured. The temperature at which the deformation amount in the height direction was 1 mm or more was defined as the softening point.

An organopolysiloxane resin containing a hydrosilylation reaction catalyst was prepared by the method shown in the reference examples below, and the hot-melt properties of the organopolysiloxane resin was evaluated based on the softening point/melt viscosity. Furthermore, organopolysiloxane resin fine particles were prepared. In the reference examples, the 1,1,3,3-tetramethyl-1,3-divinyl disiloxane used for the platinum complex that is the hydrosilylation reaction catalyst is described as "1,3-divinyltetramethyldisiloxane".

Reference Example 1: Hot-Melt Organopolysiloxane Resin Fine Particles

A xylene solution of a resinous organopolysiloxane containing 10 ppm of platinum metal in mass units was prepared by charging 270.5 g of a 55 mass % xylene solution of an organopolysiloxane as expressed by the average unit formula:

(Me$_3$SiO$_{1/2}$)$_{0.44}$(SiO$_{4/2}$)$_{0.56}$(HO$_{1/2}$)$_{0.02}$ which is a white solid at 25° C., and 0.375 g of a 1,3-divinyltetramethyldisiloxane solution of a 1,3-divinyltetramethyldisiloxane complex of platinum (platinum metal content=approximately 4,000 ppm) into a 1 L flask and stirring uniformly at room temperature (25° C.). Furthermore, this organopolysiloxane resin did not soften/melt even when heated to 200° C. and had hot melt properties.

A xylene solution of the organopolysiloxane resin prepared as described above was converted into particles while removing the xylene by a spray method using a spray dryer at 50° C. Thus, spherical, non-hot melt organopolysiloxane resin fine particles were prepared. Observation of the microparticles with an optical microscope revealed that the particle diameter was 5 to 10 μm and the average particle diameter was 7.4 μm.

Example 1

(a+c(pt)) 69.8 g of the non-hot melt organopolysiloxane resin microparticles obtained in Reference Example 1 (vinyl group content=0 mass %),
(b1) 29.9 g of dimethylpolysiloxane capped at both molecular terminals with dimethylvinylsiloxy groups represented by the formula: ViMe$_2$SiO(Me$_2$SiO)$_{800}$SiViMe$_2$ (vinyl group content=0.09 mass %),
(c4(SiH)) 0.2 g of organohydrogenpolysiloxane expressed by the formula: Me$_3$SiO(MeHSiO)$_7$(Me$_2$SiO)$_{6.5}$SiMe$_3$ {an amount such that the silicon-bonded hydrogen atoms in the organohydrogenpolysiloxane is 1.4 mol relative to 1 mol of vinyl groups in the dimethylpolysiloxane capped at both molecular terminals with dimethylvinylsiloxy groups},
(d1) 234.4 g of alumina (AES-12 from Sumitomo Chemicals) having an average particle size of 0.44 μm, and 1-ethynyl-1-cyclohexanol (amount to make 1,000 ppm in mass units relative to this composition), was batch fed into a small grinder and stirred for 1 minute at room temperature (25° C.) to prepare a uniform curable granular silicone composition. The composition contained 0.10 mole % of vinyl groups in 100 g of silicone component. Furthermore, the softening point of the composition was 80° C.

The granular curable silicone composition of Example 1 was heated to 80° C., heated and melted using a twin-screw extruder, kneaded in the form of a semi-solid softened material, and then fed onto a release film (Biwa Liner FL3-01 manufactured by Takara Inc.) at a feed rate of 5 kg/hour and laminated between the two release films. The laminate body was then stretched between rolls to form a laminate body in which a hot-melt curable silicone sheet having a thickness of 500 μm is laminated between two release films, and the entire laminate body was cooled by a cooling roller set at −15° C. The configuration of the manufacturing device is illustrated in FIG. 1.

In Example 1, when the release film was separated, it was possible to obtain a flat and homogeneous hot melt curable silicone sheet.

Comparative Example 1

The same composition as the curable granular silicone composition used in Example 1 above was laminated between two release films at room temperature without heating and kneading using a twin screw extruder, and press molding was performed at a pressure of 30 MPa, and set to the same thickness as in Example 1. The result was that when the release film was separated, the hot meltable curable silicone sheet produced cracks in the entirety, and thus cannot be used as a single sheet of curable silicone.

Reference Example 2: Hot-Meltable Organopolysiloxane Resin Fine Particles (2)

A toluene solution of a resinoid organopolysiloxane (1) containing 10 ppm of platinum metal in mass units was prepared by adding
270.5 g of a 55 mass % toluene solution of a resinous organopolysiloxane represented by the average unit formula:

(PhSiO$_{3/2}$)$_{0.80}$(Me$_2$ViSiO$_{1/2}$)$_{0.20}$, which is a white solid at 25° C.,
21.3 g of a diphenylsiloxane capped at both molecular terminals with dimethylhydrogensiloxy groups and having a viscosity of 5 mPa·s (silicon-bonded hydrogen atom content=0.6 mass %) expressed by the formula:

HMe$_2$SiO(Ph$_2$SiO)SiMe$_2$H, (in an amount such that the amount of silicon-bonded hydrogen atoms in the component is 0.5 mol relative to 1 mol of vinyl groups in the resinoid organopolysiloxane), and 0.43 g of a 1,3-divinyltetramethyldisiloxane solution of platinum 1,3-divinyltetramethyldisiloxane complex (platinum metal content=approximately 4,000 ppm) (in an amount such that the amount of platinum metal is 10 ppm in mass units with respect to the liquid mixture) into a 1 L flask and stirring uniformly at room temperature.

Thereafter, the temperature in the flask was raised to 100° C. by an oil bath, and the mixture was stirred under a reflux of toluene for 2 hours to prepare a toluene solution of an organosiloxane crosslinked product containing a resinoid organosiloxane derived from the above-mentioned resinoid organopolysiloxane and a chained organosiloxane derived from the above-mentioned diphenylsiloxane and having a vinyl group not involved in the above-mentioned reaction. When the organosiloxane crosslinked product (1) was analyzed by FT-IR, peaks of silicon-bonded hydrogen atom were not observed. In addition, the softening point of this organosiloxane crosslinked product was 75° C., and the melt viscosity thereof at 100° C. was 700 Pa·s.

True-spherical hot-melt silicone fine particles (2) were prepared by atomizing the toluene solution of the organosiloxane crosslinked product prepared in as described above by spray drying at 40° C. while removing toluene. Observation of the fine particles with an optical microscope revealed that the particle diameter was 5 to 10 μm and the average particle diameter was 7.5 μm.

Example 2

73.1 g of hot meltable silicone fine particles (2), 9.5 g of diphenylsiloxane capped at both molecular terminals with dimethylhydrogensiloxy groups and having a viscosity of 5 mPa·s (silicon-bonded hydrogen atom content=0.6 mass %) represented by the formula: $HMe_2SiO(Ph_2SiO)SiMe_2H$, 17.4 g of a methylphenylpolysiloxane capped at both molecular terminals with dimethylvinylsiloxy groups, having a viscosity of 1000 mPa·s, and represented by the average unit formula: $Me_2ViSiO(MePhSiO)_{17.5}SiMe_2Vi$ (vinyl group content=2.1 mass %){an amount such that the amount of silicon-bonded hydrogen atoms in the diphenylsiloxane is 0.9 mol relative to 1.0 mol of vinyl groups in the silicone fine particles (1) and the methylphenylpolysiloxane capped at both molecular terminals with dimethylvinylsiloxy groups}, 1-ethynyl-1-cyclohexanol (in an amount to make 300 ppm by mass units of the composition), 24.0 g of fused silica having an average particle diameter of 2.5 μm (SP-60 manufactured by Nippon Steel Materials Micron, Inc.), and 30.0 g of fumed silica having an average particle diameter of 0.04 μm (AEROSIL 50 manufactured by Japan Aerosil) were charged as a single batch into a small pulverizer and stirred for 1 minute at room temperature (25° C.) to prepare a uniform curable granular silicone composition. Furthermore, the softening point of the composition was 60° C.

The granular curable silicone composition of Example 2 described above was heated to 80° C., melted and kneaded using a twin-screw extruder, and formed into a sheet shape using a T-type die (opening dimensions: 800 μm×100 mm, heated to 80° C.), and then fed onto a release film (Biwa Liner FL3-01 manufactured by Takara Inc.) at a feed rate of 5 kg/hour. The entire sheet was cooled by a cooling roller set at −15° C., and then laminated between the two release films. The laminate body was then stretched between rollers to form a laminate body in which a hot-melt curable silicone sheet having a thickness of 500 μm is laminated between two release films. The configuration of the manufacturing device is illustrated in FIG. 3.

In Example 2, when the release film was separated, it was possible to obtain a flat and homogeneous hot melt curable silicone sheet.

Example 3

The curable granular silicone composition of Example 1 or Example 2 was heated and melt-kneaded using a twin screw extruder while heating to 80° C., where the outlet temperature of the twin screw extruder is 80° C., and the mixture is in the form of a semi-solid softened material. The film was provided on a 75 μm thick release film (FL2-01 manufactured by Takara Corporation, Ltd.) at a supply rate of 5 kg/hour, and laminated between two release films. Subsequently, the laminate was stretched between rollers that were temperature-controlled to 90° C., thereby forming a laminate in which a hot melt curable silicone sheet with a thickness of 300 μm was laminated between two releasable films, and the entire laminate was cooled by air cooling. The time taken from line 2 to roll stretching was approximately 2 minutes. The configuration of the manufacturing device is illustrated in FIG. 3.

In Example 3, when the release film was separated, it was possible to obtain a flat and homogeneous hot melt curable silicone sheet without foaming.

REFERENCE NUMERALS

FIG. 1
1: Extruder
2: Guiding roller
3-a: Release sheet
3-b: Release sheet
4-a: Stretching roller (may be optionally further provided with temperature control function)
4-b: Stretching roller (may be optionally further provided with temperature control function)
5: Cooling roller FIG. 2
1: Extruder
2: T die
3: Cooling roller
4-a: Release sheet
4-b: Release sheet
5: Guiding roller
6-a: Stretching roller (may be optionally further provided with temperature control function)
6-b: Stretching roller (may be optionally further provided with temperature control function)

FIG. 3
1: Extruder
2: Guiding roller
3-a: Release sheet
3-b: Release sheet
4-a: Stretching roller (may be optionally further provided with temperature control function)
4-b: Stretching roller (may be optionally further provided with temperature control function)
5: Cooling roller
6: Film thickness meter
7: Foreign material inspecting machine
8: Sheet cutter

The invention claimed is:

1. A method of manufacturing a curable silicone sheet having hot melt properties, comprising the following steps:
   1) Mixing organopolysiloxane resin fine particles, a curing agent, and a functional filler at a temperature that is lower than a softening point of the organopolysiloxane resin fine particles;
   2) Kneading a mixture obtained in step 1) while heating and melting at a temperature in a range from the softening point of the organopolysiloxane resin fine particles to 120° C.;
   3) Laminating a heated and melted mixture obtained in step 2) between a first film and a second film with at least one of the first film and the second film having a release surface; and
   4) stretching a laminate body obtained in step 3) between a pair of adjacent rollers to mold a curable silicone sheet having a specific film thickness.

2. The method of manufacturing the curable silicone sheet having hot melt properties according to claim 1, wherein:
   a melt viscosity of the heated and melted mixture obtained in step 2), as measured by a Koka flow tester at 150° C., is within a range of 1 to 1,000 Pas,
   step 3) is further defined as a step of laminating the heated and melted mixture between the first film and the second film having at least one release surface by discharging the heated and melted mixture while molding into a film or a string using a die and a nozzle, and
   as a pre-step of step 4) or in step 4), the laminate body obtained in step 3) further includes a step of cooling or adjusting the temperature between 80 and 120° C.

3. The method of manufacturing the curable silicone sheet having hot melt properties according to claim 1, wherein:
   a softening point of the mixture obtained in step 2) is 200° C. or less,
   step 2) is a step of heating the mixture obtained in step 1) to a temperature above the softening point of the mixture, and
   step 3) is further defined as a step of laminating the heated and melted mixture between the first film and the second film having at least one release surface by discharging the heated and melted mixture in a solid form.

4. The method of manufacturing the curable silicone sheet having hot melt properties according to claim 1, wherein steps 2) to 4) are continuous steps, and a time from a start of step 2) to an end of step 4) is 30 minutes or less.

5. The method of manufacturing the curable silicone sheet having hot melt properties according to claim 1, further comprising:
   cutting the laminate body containing the curable silicone sheet obtained in step 4).

6. The method of manufacturing the curable silicone sheet having hot melt properties according to claim 1, wherein step 3) is further defined as a step of discharging the heated and melted mixture while molding into a film or string using a die selected from T dies and strand dies and a nozzle selected from single nozzles and multi nozzles, and then laminating between the first film and the second film having at least one release surface.

7. The method of manufacturing the curable silicone sheet having hot melt properties according to claim 1, wherein
   the organopolysiloxane resin fine particles in step 1) are organopolysiloxane resin fine particles where at least 20 mol % of all siloxane units contained therein are siloxane units expressed by $RSiO_{3/2}$ or $SiO_{4/2}$ where R is an organic group.

8. The method of manufacturing the curable silicone sheet having hot melt properties according to claim 1, wherein the mixture obtained in step 2) provides, by curing, a cured product where:
   a value of a storage elastic modulus (G') at 25° C. is 2,000 MPa or less,
   a value of a storage elastic modulus (G') at 150° C. is 100 MPa or less, and
   a peak value of a loss tangent (tan δ), which is expressed by a storage elastic modulus/loss elastic modulus at a frequency of 1.0 Hz, is 0.40 or more.

9. The method of manufacturing the curable silicone sheet having hot melt properties according to claim 1, wherein the mixture of the organopolysiloxane resin fine particles having hot melt properties, curing agent, and functional filler in step 1) provides, by curing, a cured product, where:
   (1) a maximum torque measured at a molding temperature of room temperature through 200° C. using an MDR (Moving Die Rheometer) is less than 50 dN·m, and
   (2) a loss tangent (tan δ) as expressed by a ratio of stored torque value/lost torque value is less than 0.2.

10. The method of manufacturing the curable silicone sheet having hot melt properties according to claim 1, wherein the curable silicone sheet is suitable for compression molding, press molding, or vacuum lamination.

11. The method of manufacturing the curable silicone sheet having hot melt properties according to claim 1, wherein the curable silicone sheet is a hot melt film adhesive.

12. The method of manufacturing the curable silicone sheet having hot melt properties according to claim 1, wherein the curable silicone sheet is an essentially flat curable silicone sheet with a thickness of 10 to 2000 μm.

13. A method of manufacturing the laminate body according to claim 1, comprising the step of laminating an essentially flat curable silicone sheet having hot melt properties and a thickness of 10 to 2000 μm between the first film and the second film with at least one release surface.

14. The method according to claim 13, wherein the release surface is a release coating layer obtained by curing a curable organopolysiloxane composition containing one or more types of an organopolysiloxane having a substitution group containing fluorine bonded to a silicon atom in one molecule, and the thickness of at least one film providing the release surface is 50 μm or more.

* * * * *